(12) United States Patent
Hata

(10) Patent No.: US 7,582,018 B2
(45) Date of Patent: Sep. 1, 2009

(54) GAME CONTROL METHOD

(75) Inventor: Shintaro Hata, Tokyo (JP)

(73) Assignee: Sega Corporation, Tokyo (JP)

( * ) Notice: Subject to any disclaimer, the term of this patent is extended or adjusted under 35 U.S.C. 154(b) by 202 days.

(21) Appl. No.: 10/515,065

(22) PCT Filed: May 21, 2003

(86) PCT No.: PCT/JP03/06338

§ 371 (c)(1),
(2), (4) Date: Jun. 20, 2005

(87) PCT Pub. No.: WO03/097197

PCT Pub. Date: Nov. 27, 2003

(65) Prior Publication Data

US 2005/0233804 A1    Oct. 20, 2005

(30) Foreign Application Priority Data

May 21, 2002  (JP) .............................. 2002-146984

(51) Int. Cl.
*A63F 13/00* (2006.01)
(52) U.S. Cl. ................ 463/43; 463/1; 463/40
(58) Field of Classification Search ............ 463/43, 463/44; 369/47.1
See application file for complete search history.

(56) References Cited

U.S. PATENT DOCUMENTS

| | | | | |
|---|---|---|---|---|
| 4,948,138 A | * | 8/1990 | Pease et al. ................ 463/24 |
| 5,273,294 A | * | 12/1993 | Amanai .................... 463/24 |
| 5,395,242 A | * | 3/1995 | Slye et al. ................. 463/1 |
| 5,752,883 A | * | 5/1998 | Butcher et al. ............. 463/43 |
| 5,759,100 A | | 6/1998 | Nakanishi | |
| 5,810,666 A | * | 9/1998 | Mero et al. ................ 463/41 |
| 5,954,332 A | * | 9/1999 | Mero et al. ............... 273/236 |
| 5,961,386 A | * | 10/1999 | Sawaguchi ................ 463/43 |
| 5,971,856 A | * | 10/1999 | Aoyama et al. ............ 463/43 |
| 6,045,447 A | * | 4/2000 | Yoshizawa et al. .......... 463/31 |
| 6,165,073 A | * | 12/2000 | Miyamoto et al. .......... 463/32 |
| 6,171,189 B1 | * | 1/2001 | Katano et al. ............. 463/43 |

(Continued)

FOREIGN PATENT DOCUMENTS

EP    0 684 057 A1    5/1995

(Continued)

OTHER PUBLICATIONS

"Cloning weapons, duplicating items", Feb. 26, 2001, PSO-World.com Forum.*

(Continued)

*Primary Examiner*—Corbett Coburn
*Assistant Examiner*—Joshua P. Wert
(74) *Attorney, Agent, or Firm*—Dickstein Shapiro LLP

(57) ABSTRACT

The present invention relates to a control method for controlling gate data of a game in which a plurality of players take part. Before the start of the game, game data is copied form the memory region of each player and stored in a prescribed game memory region, based on the game data of each player stored in the prescribed game memory region, the game is played, and after the end of the game, the game data of each player stored in the game memory region is returned to the memory region of each player.

2 Claims, 35 Drawing Sheets

U.S. PATENT DOCUMENTS

| | | | |
|---|---|---|---|
| 6,200,216 B1* | 3/2001 | Peppel | 463/1 |
| 6,203,431 B1* | 3/2001 | Miyamoto et al. | 463/31 |
| 6,220,964 B1* | 4/2001 | Miyamoto et al. | 463/43 |
| 6,238,291 B1* | 5/2001 | Fujimoto et al. | 463/44 |
| 6,267,676 B1* | 7/2001 | Nagaoka | 463/43 |
| 6,270,416 B1* | 8/2001 | Komoto | 463/43 |
| 6,733,382 B2* | 5/2004 | Oe et al. | 463/1 |
| 6,773,325 B1* | 8/2004 | Mawle et al. | 446/175 |
| 2002/0052238 A1 | 5/2002 | Muroi | |
| 2002/0111216 A1* | 8/2002 | Himoto et al. | 463/43 |
| 2005/0233804 A1* | 10/2005 | Hata | 463/29 |
| 2006/0166744 A1* | 7/2006 | Igarashi et al. | 463/43 |

FOREIGN PATENT DOCUMENTS

| | | |
|---|---|---|
| EP | 1 065 599 A1 | 1/2001 |
| GB | 2 333 824 A | 6/1999 |
| JP | 2610694 | 2/1997 |
| JP | 3228216 | 9/2001 |
| WO | WO00/39688 | 7/2000 |

OTHER PUBLICATIONS

"Virtual worlds #4: have you been duped?", Aug. 22, 2005, yahoo.com.*

"Nintendo world report editorial", Jul. 19, 2001, nintendoworldreport.com.*

* cited by examiner

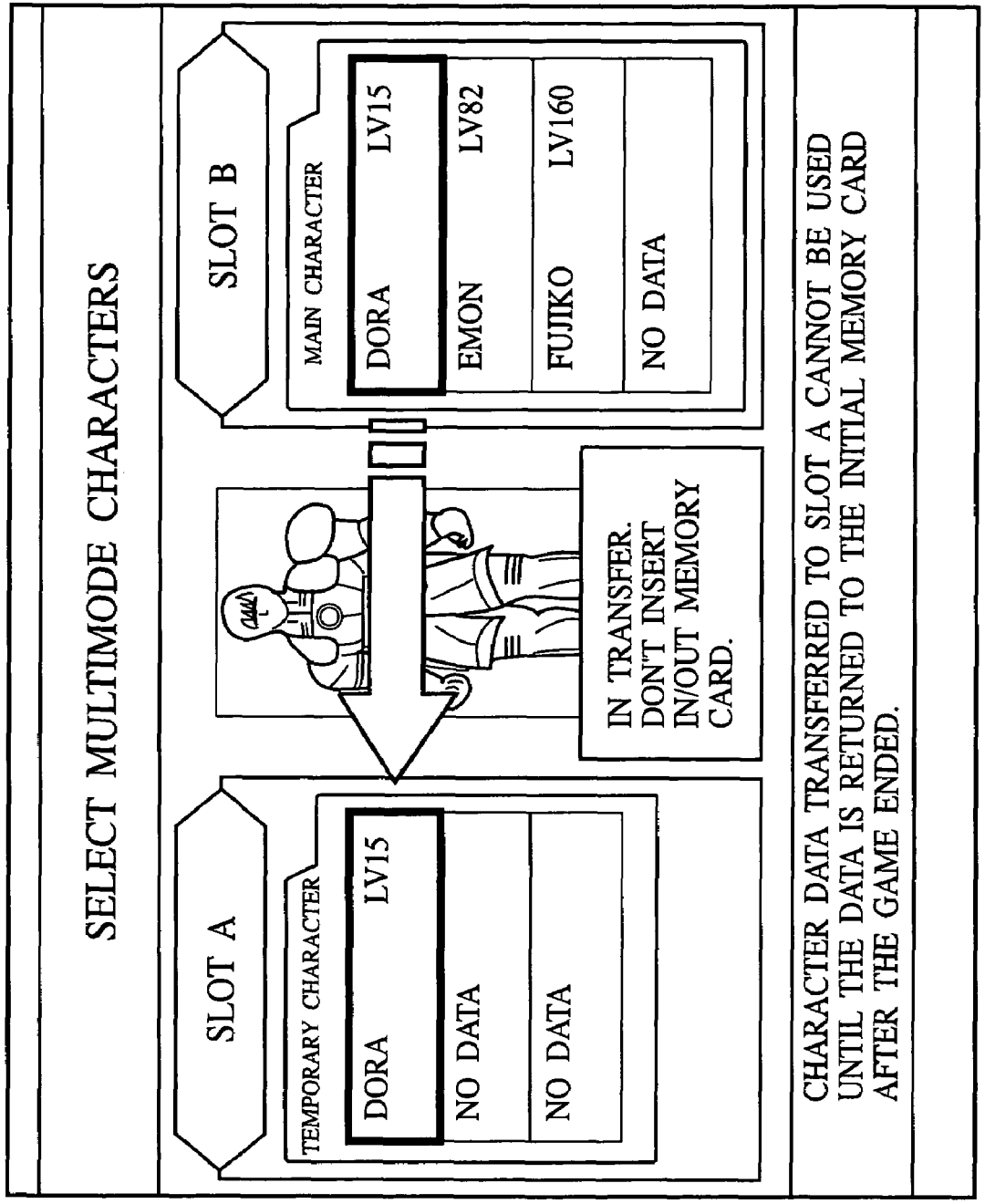

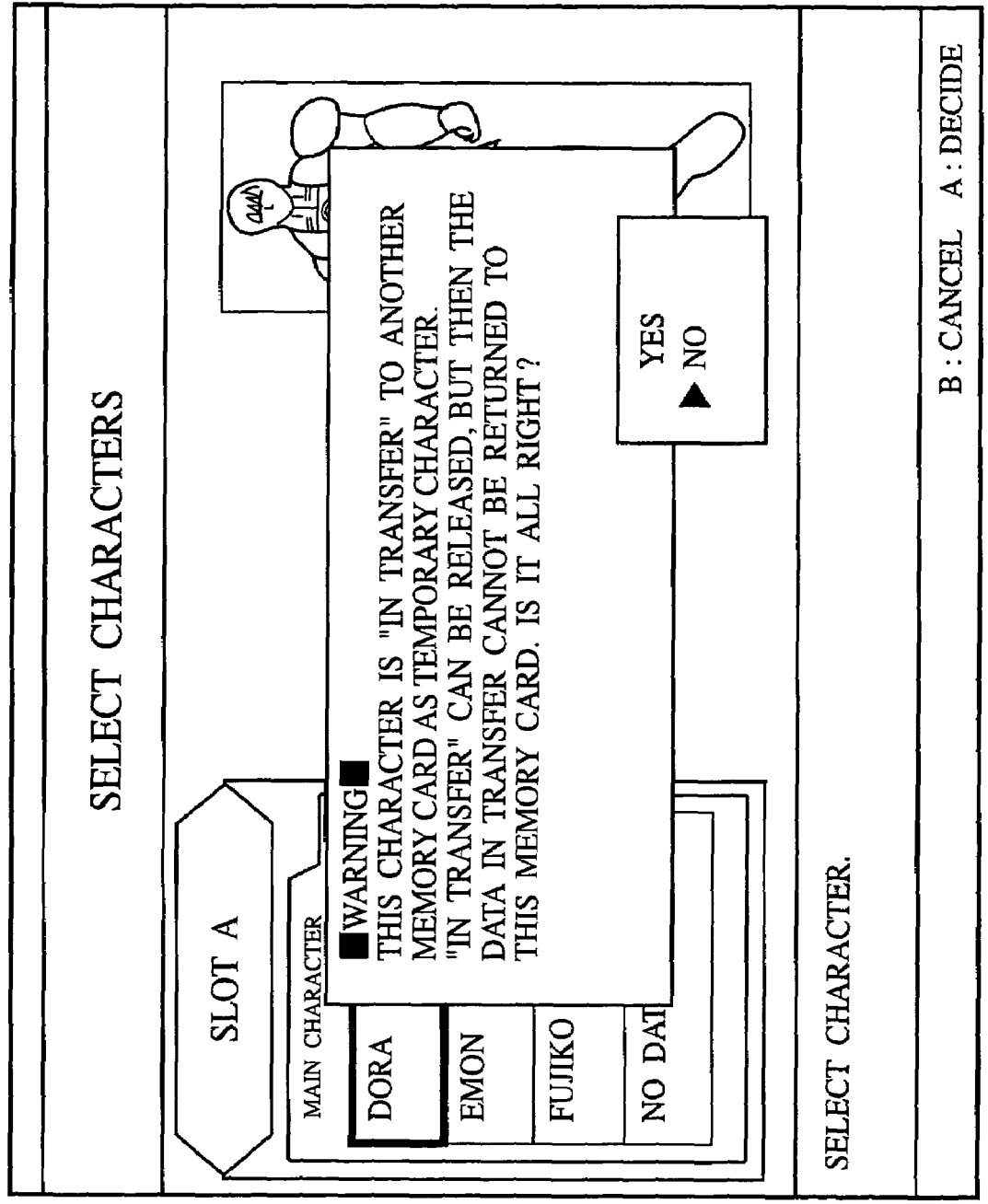

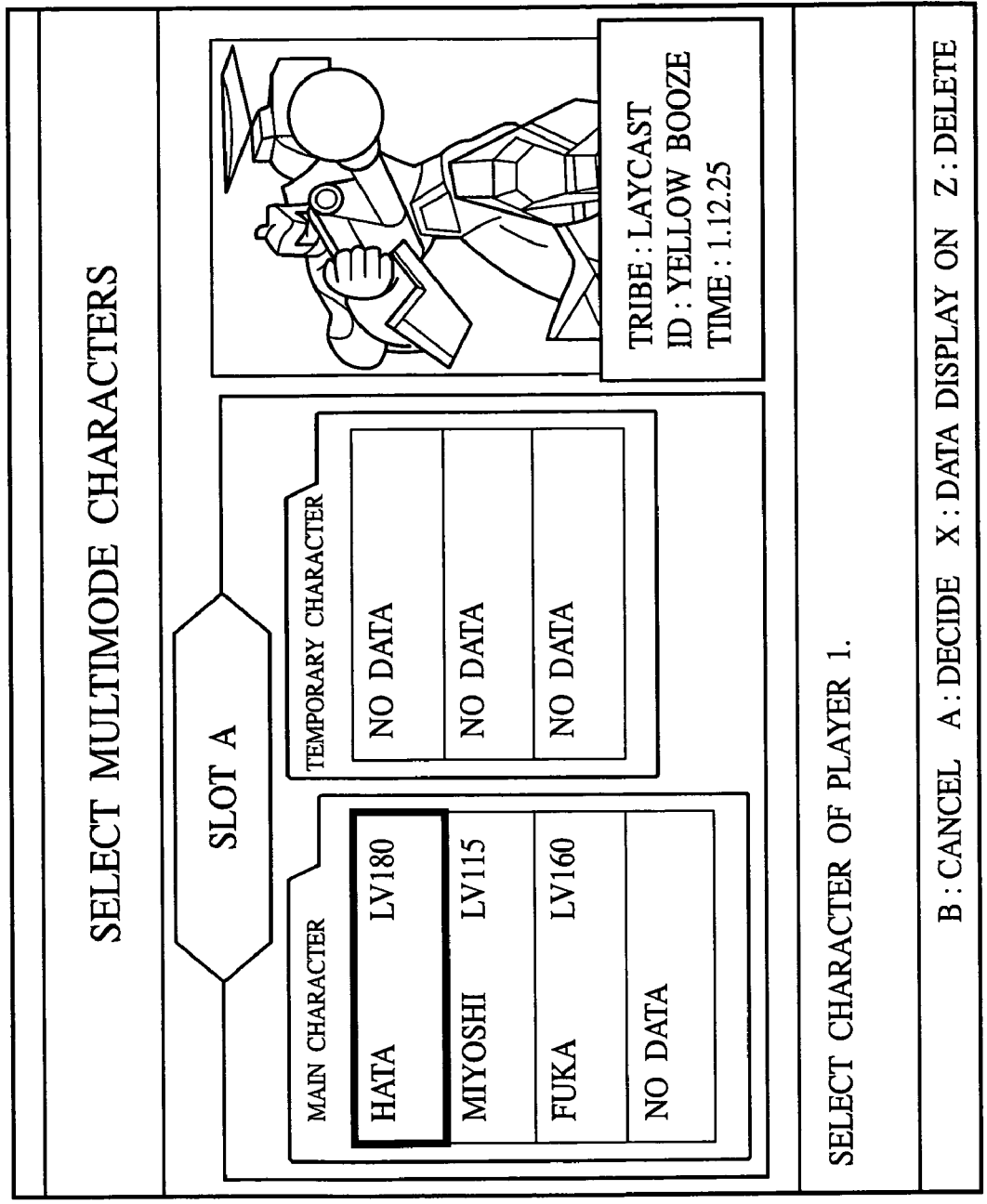

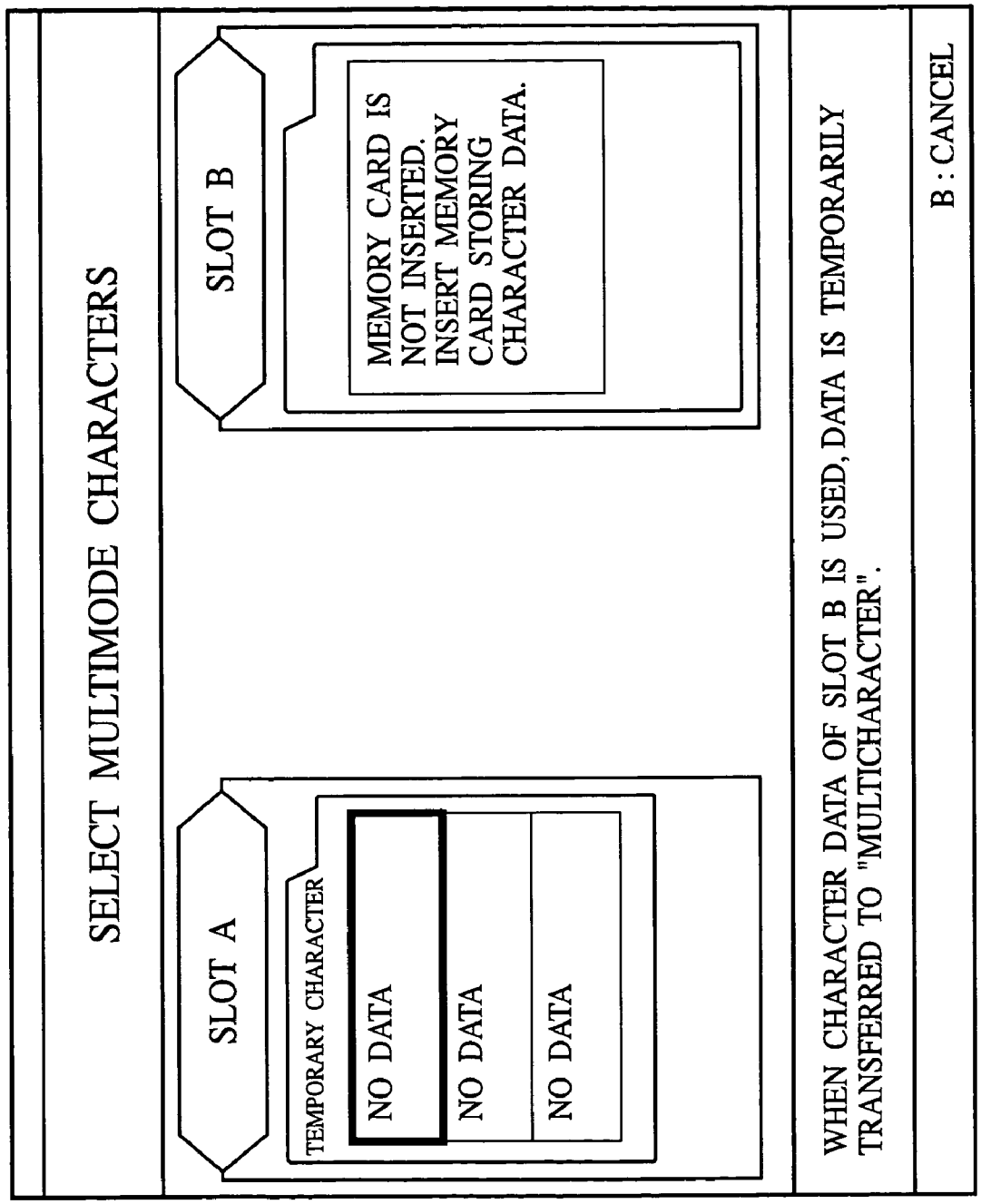

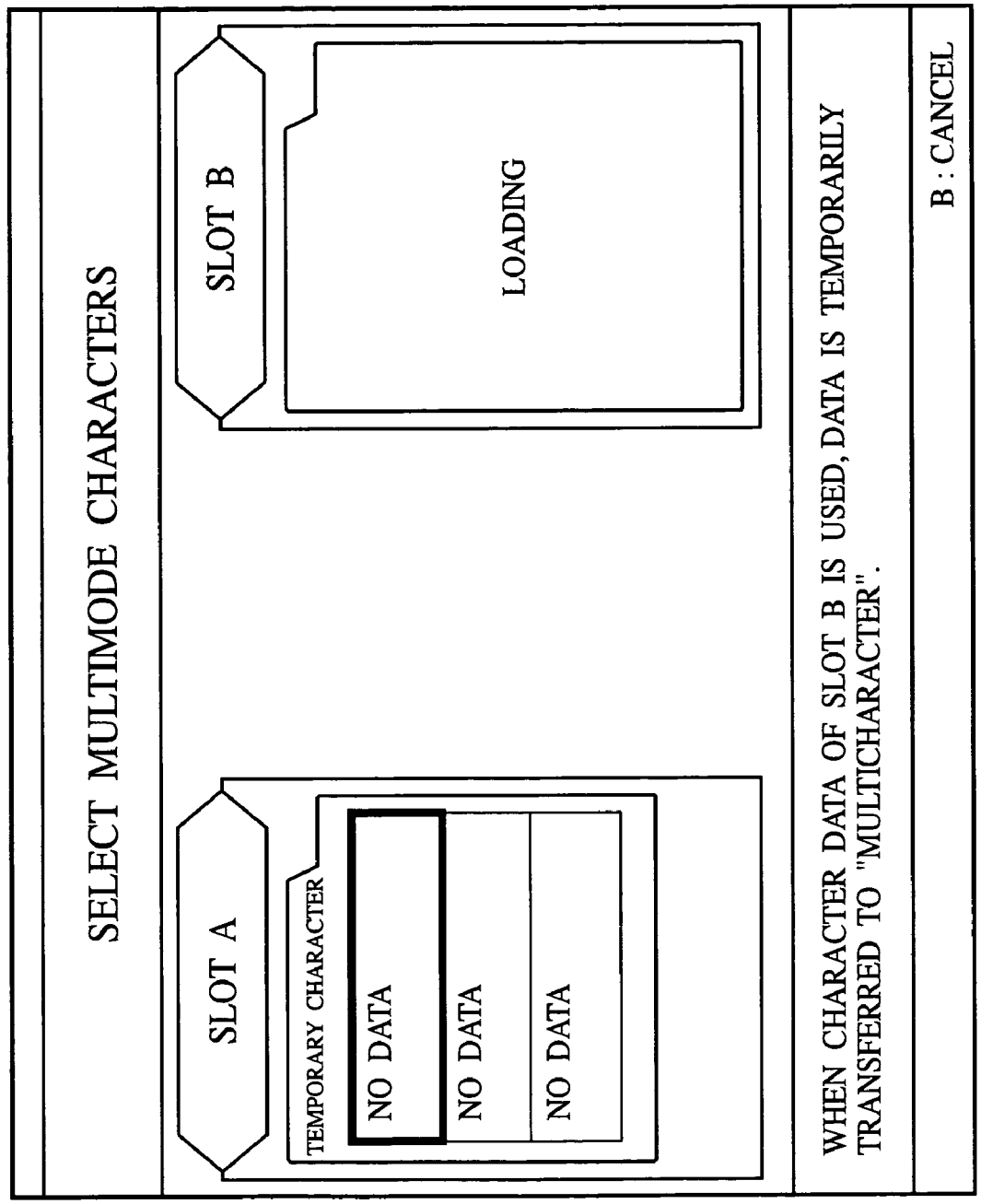

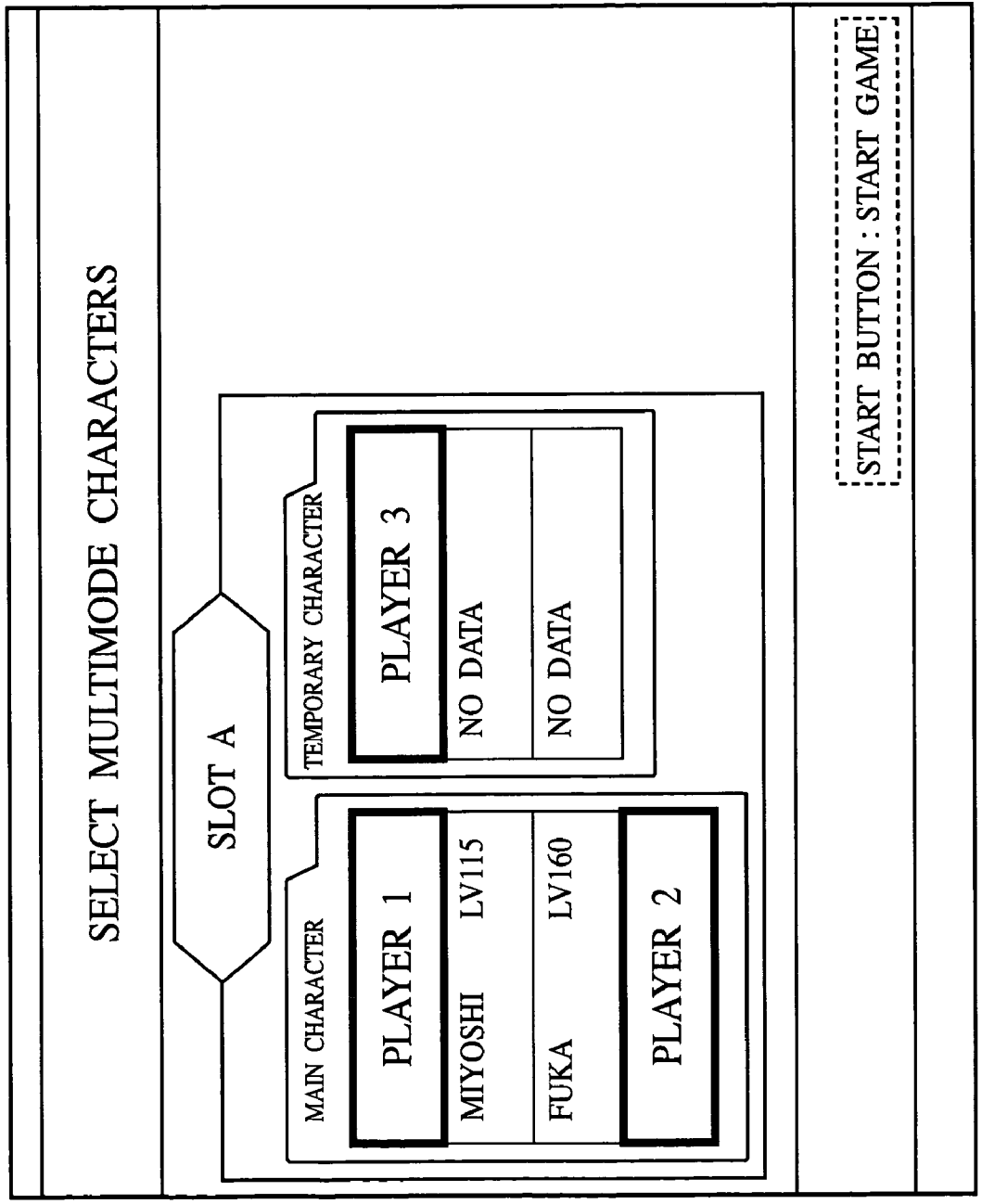

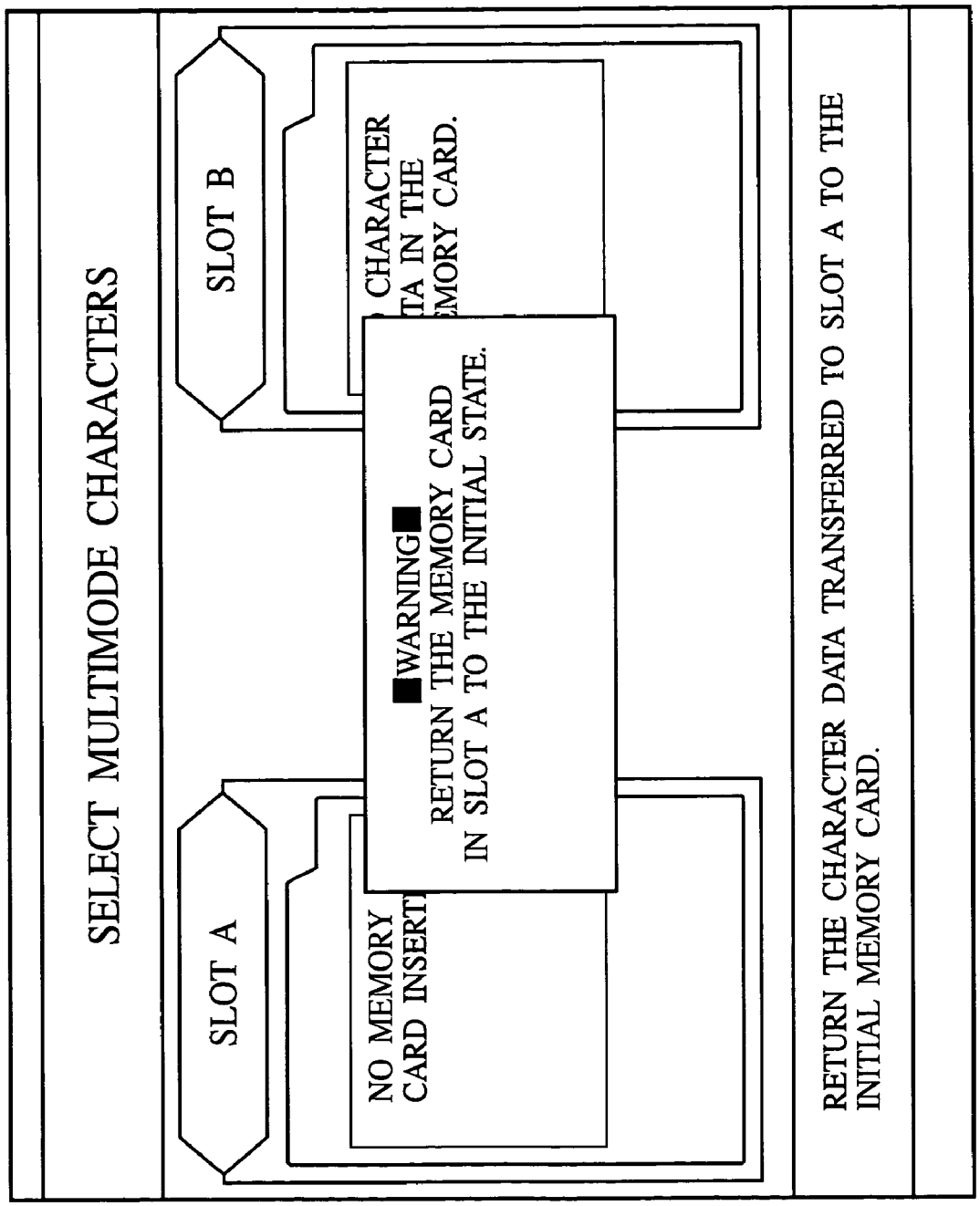

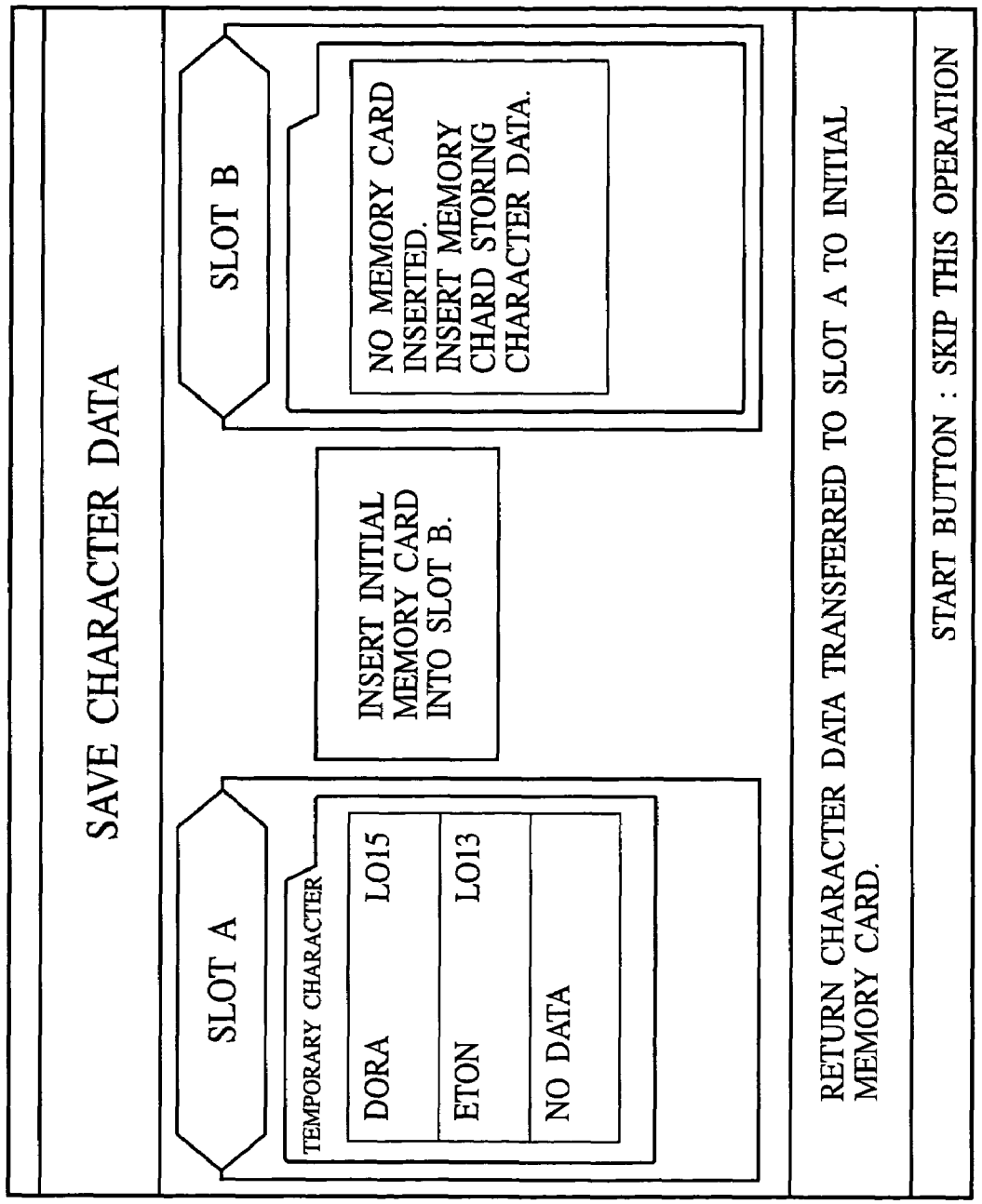

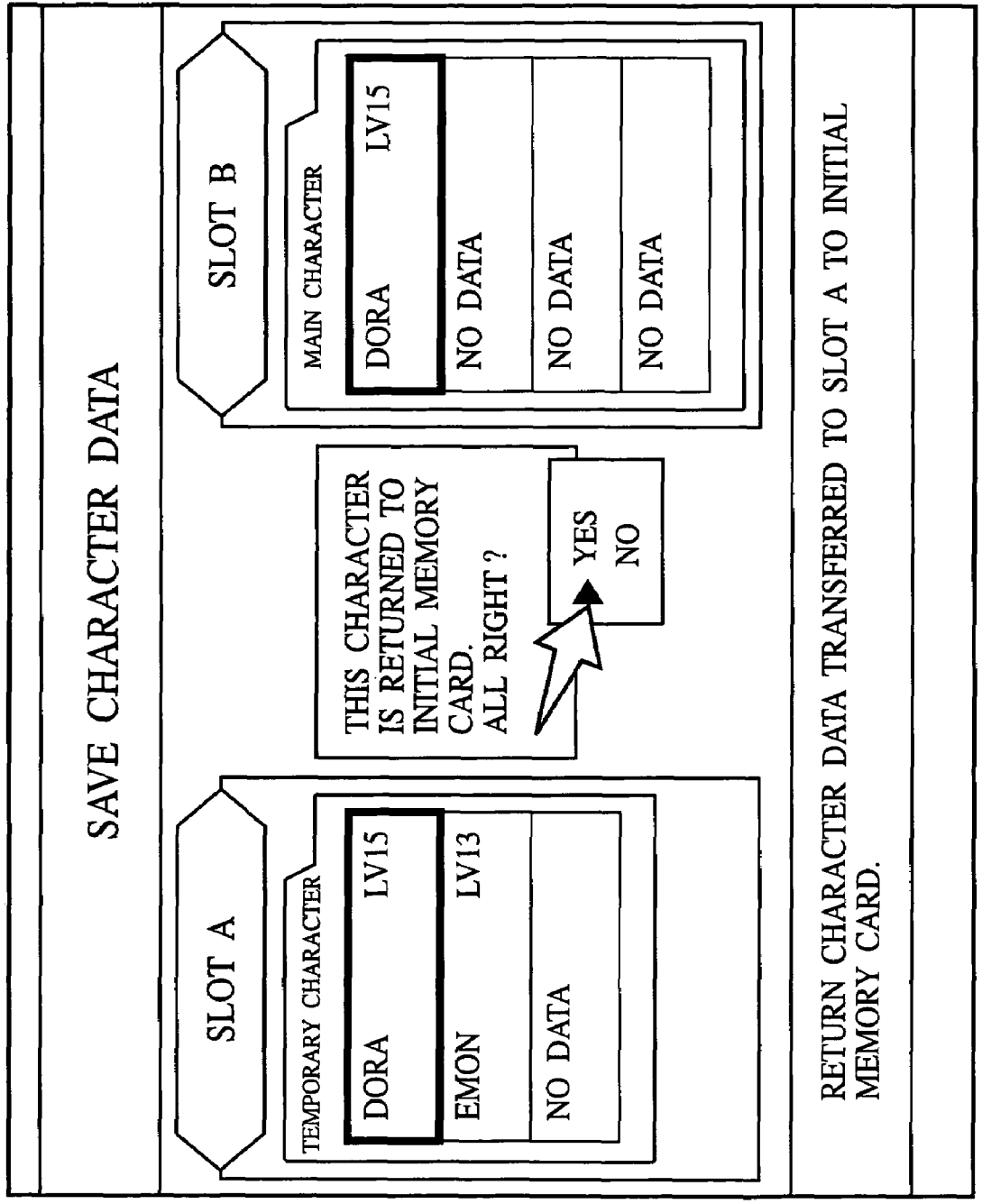

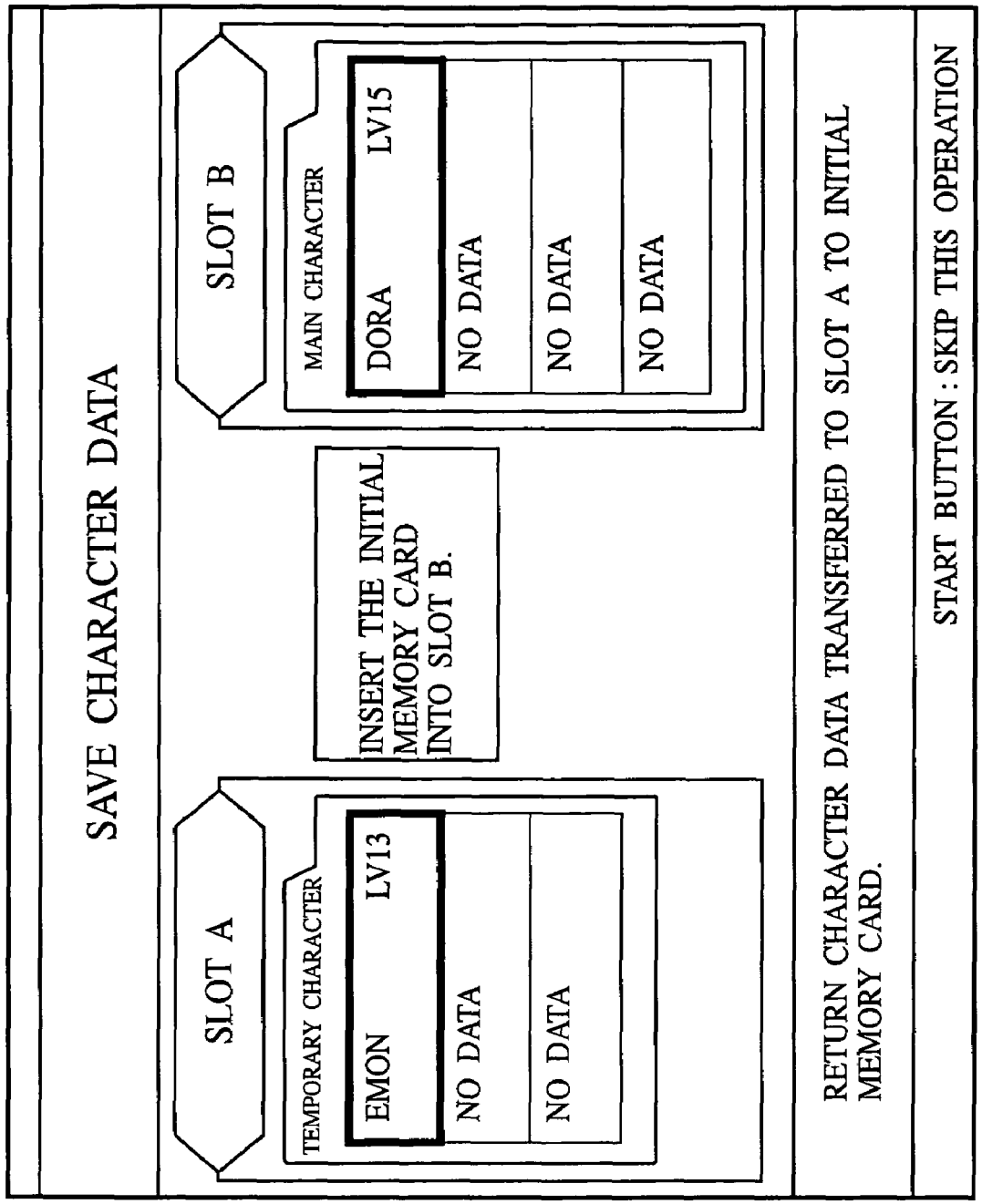

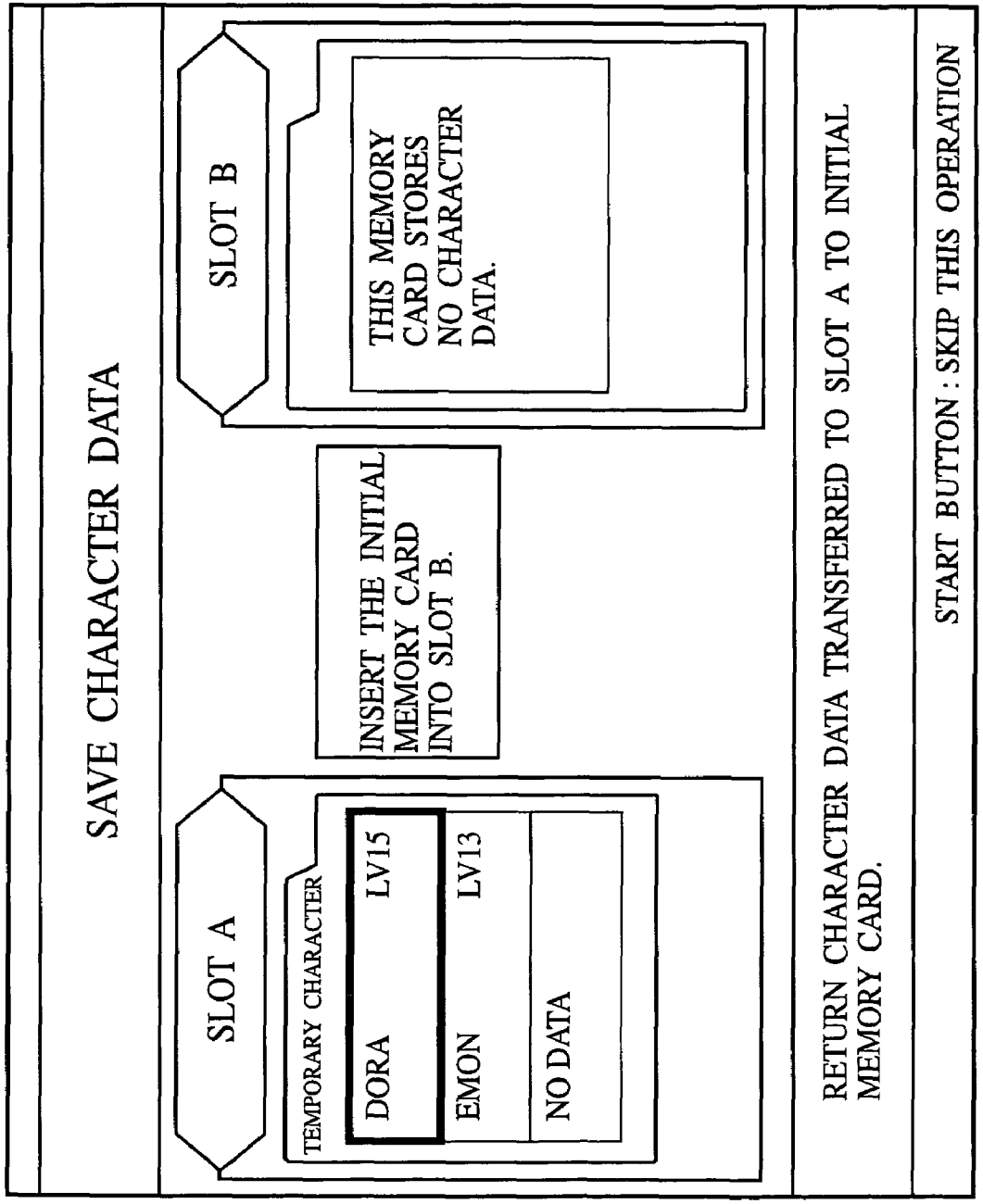

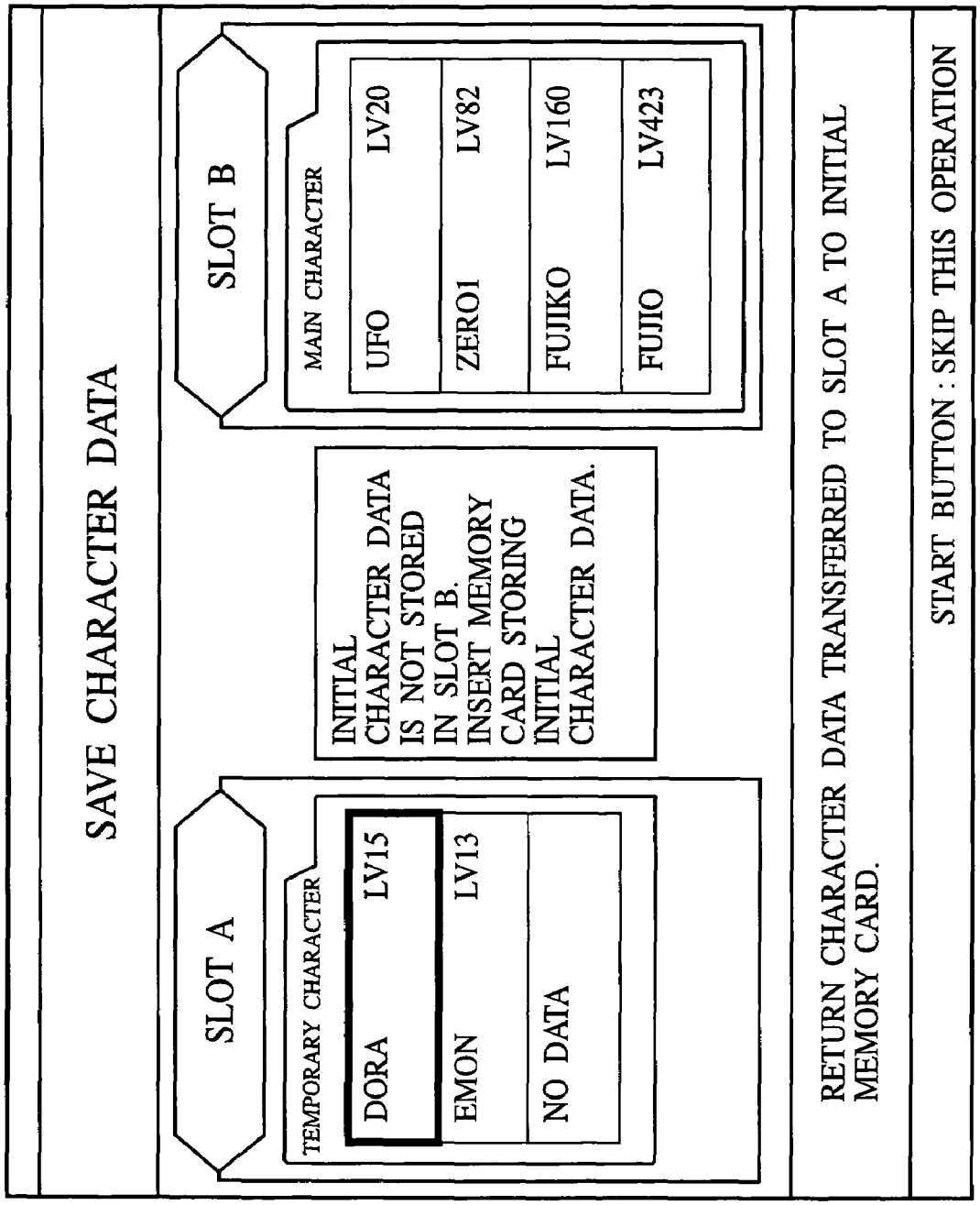

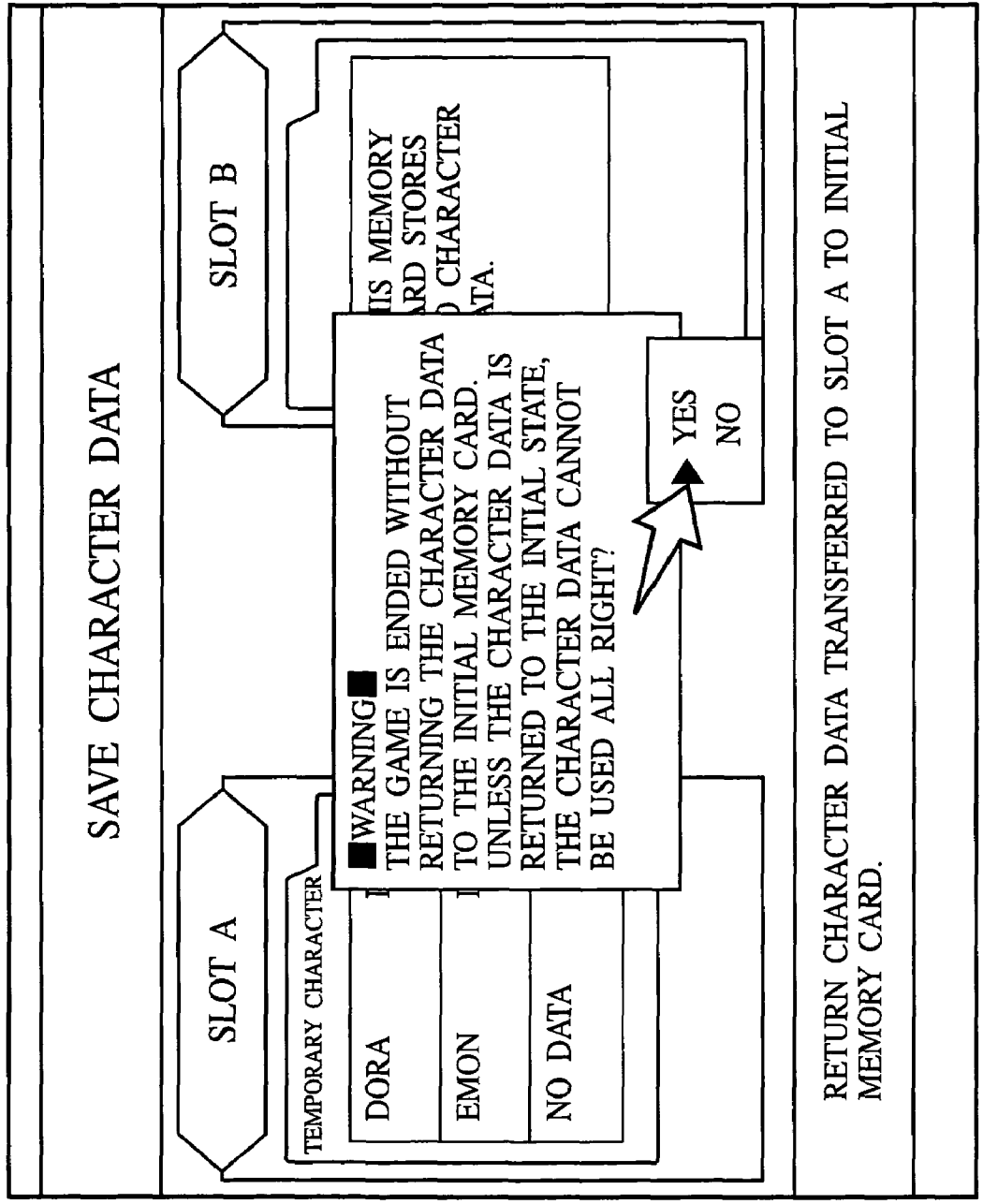

US 7,582,018 B2

GAME CONTROL METHOD

This application is claims priority to international (PCT) application PCT/JP03/06338 filed Apr. 21, 2003, which claims priority to Japanese patent application 2002-146984 filed May 21, 2002. The contents of these applications are hereby incorporated by reference.

TECHNICAL FIELD

The present invention relates to a game control method for controlling which a game a plurality of players take part in.

BACKGROUND ART

Games which are played by a plurality of players respectively connected to a game apparatus via communication networks, such as telephone circuit, etc., the so-called online games are noted as a new category of games. An example of such games is an online game in which respective players produce their own characters and connect to a communication network to make a team of their characters to make adventures. In the online game, making the adventures, each player tries to reinforce his character by increasing his items by picking up rare items, exchanging items with other players or increasing his own power to level up.

Usually, a player has his own memory card. Not only in online games but also in many games, when he interrupts a game, he stores game data, such as his own character, etc. in his own memory card connected to a game apparatus, and when he resumes the game, he reads the game data from the memory card and resumes the game where he has interrupted the game.

Usually, for an online game, the so-called offline mode in which the online game can be played without being connected to a communication network is prepared. The offline mode is used to practice the online game to know the outline of the online game or to raise in advance the level of the game player to some extent. Usually, game data, such as his own character data, etc., are changed by the offline game, and the changed game data can be stored in the memory card. The game player takes part in the online game, using the stored character data.

As a new mode for playing in the offline mode is proposed a multimode in which a plurality of players gather at one place, and the characters of the plurality of players make a team to make adventures without connecting to a communication network. Such multimode, if realized, permits friends to enjoy playing games without being conscious of the communication fees.

However, a number of the memory slots of the game apparatus is limited and is often insufficient for a number of the players. Furthermore, if the control of the game data is simply common between the online mode and the offline mode, players might unfairly obtain items or power up their own characters. A new game control method for controlling a game is required so as to solve such inconveniences.

An object of the present invention is to provide a game control method which is suitable for the offline mode of a game which a plurality of players take part in.

SUMMARY OF THE INVENTION

The above-described object is attained by a game control method for controlling a game in which a plurality of players take part in, comprising the steps of: before a start of the game, copying game data from the memory region of each player to store in a prescribed memory region; playing the game based on the game data of each player stored in the prescribed memory region; and after an end of the game, returning the game data of each player stored in the prescribed memory region to the memory region of each player.

In the above-described game control method, it is possible that when the game data of each player is returned from the prescribed memory region to the memory region of each player, it is confirmed whether or not copy information given when the game data was copied from the memory region of each player to the prescribed memory region agrees.

In the above-described game control method, it is possible that the use of the game data remaining in the memory region of each player is restricted.

In the above-described game control method, it is possible that the use of the game data remaining in the memory region of each player is permitted on the conditions that the game data stored in the prescribed memory region is not used.

In the above-described game control method, it is possible that the memory region of one player is used as said prescribed memory region.

The above-described object is attained by a game control method for controlling a game in which a plurality of players take part, wherein each player can take in an item alone related to his own game character, and in the game, the exchange of the item with items of the other players is prohibited.

In the above-described game control method, it is possible that an item obtained in said game is not restricted from being exchanged with the items of the other players.

The above-described object is attained by a game control method for controlling a game proceeded with characters respectively operated by a plurality of players, comprising the steps of: deciding an item which is to be owned by a character, which is selected by each player before a start of the game; and restricting the item of one character from being owned by other character, after the start of the game.

A program according to one aspect of the present invention is a program which can be executed by a computer, for controlling game data to resume a game in which a plurality of players take part in where the game has been paused, the game data including at least a first parameter associated with a player character who appears in the game and a second parameter associated with an item used by the player character in the game, the program comprising the steps of: before a start of the game, reading first game data and second game data respectively from a first record medium and a second record medium and storing the first game data and the second game data in a prescribed memory region; recording data for restricting the use of the game data recorded in the first record media and the second record media in the first and the second record media; executing the game, based on the first game data and the second game data stored in the prescribed memory region; renewing the first game data and the second game data corresponding to proceeding of the game respectively to third game data and fourth game data; transferring the second parameter associated with the item included in the second game data read from the second record medium to the first game data to restrict the third game data from being renewed; transferring the second parameter associated with the item included in the fourth game data renewed in accordance with the proceeding of the game and excluded in the second game data to the first game data in response to an operation signal generated by an operation of the game player to renew the third game data; and after an end of the game, recording in the first and the second record media the renewed third data and the renewed fourth data, replacing the first game data and the second game data to delete data for restricting the use of the game data.

A program according to one aspect of the present invention is a program which can be executed by a computer, for controlling game data to resume a game in which a plurality of players take part in where the game has been paused, the program comprising the steps of: before a start of the game, reading a first game data from a first record medium with the first game data recorded to store the first game data in a second record medium with second game data recorded in; recording a data for restricting use of the game data recorded in the first record medium to the first record medium; executing the game, based on the first game data and the second game data stored in the second record medium; renewing the first game data and the second game data respectively to third game data and fourth game data in accordance with proceeding of the game; and after an end of the game, recording in the first record media the renewed third data, replacing the first game data to delete the data for restricting the use of the game data.

In the above-described program which can be executed by a computer, it is possible that the game data include at least a parameter associated with a player character appearing in the game, and a parameter associated with an item used by the player character in the game, the program further comprises the steps of: transferring the parameter associated with the item included in the second game data read from the second record medium to the first game data to restrict the third game data from being renewed; and transferring the parameter associated with the item included in the fourth game data renewed in accordance with the proceeding of the game and excluded in the second game data, to the first game data in response to an operation signal generated by an operation of the game player to renew the third game data.

According to the present invention, the method comprises the steps of: before a start of the game, copying game data from the memory region of each player to store in a prescribed memory region; playing the game based on the game data of each player stored in the prescribed memory region; and after an end of the game, returning the game data of each player stored in the prescribed memory region to the memory region of each player, whereby the game data can be suitably controlled in the online mode of a game which a plurality of players take part in.

BRIEF DESCRIPTION OF THE DRAWINGS

FIG. 6 is views of images for the operation of transferring character data of the embodiment of the present invention (Part 1).

FIG. 19 is views of images for the data saving operation of the embodiment of the present invention after the end of the game (Part 3).

FIG. 20 is views of images for the data saving operation of the embodiment of the present invention after the end of the game (Part 4).

BEST MODES FOR CARRYING OUT THE INVENTION

An Embodiment

The game apparatus according to an embodiment of the present invention will be explained with reference to the drawings.

(Outline of the Game Apparatus)

Figure 1:
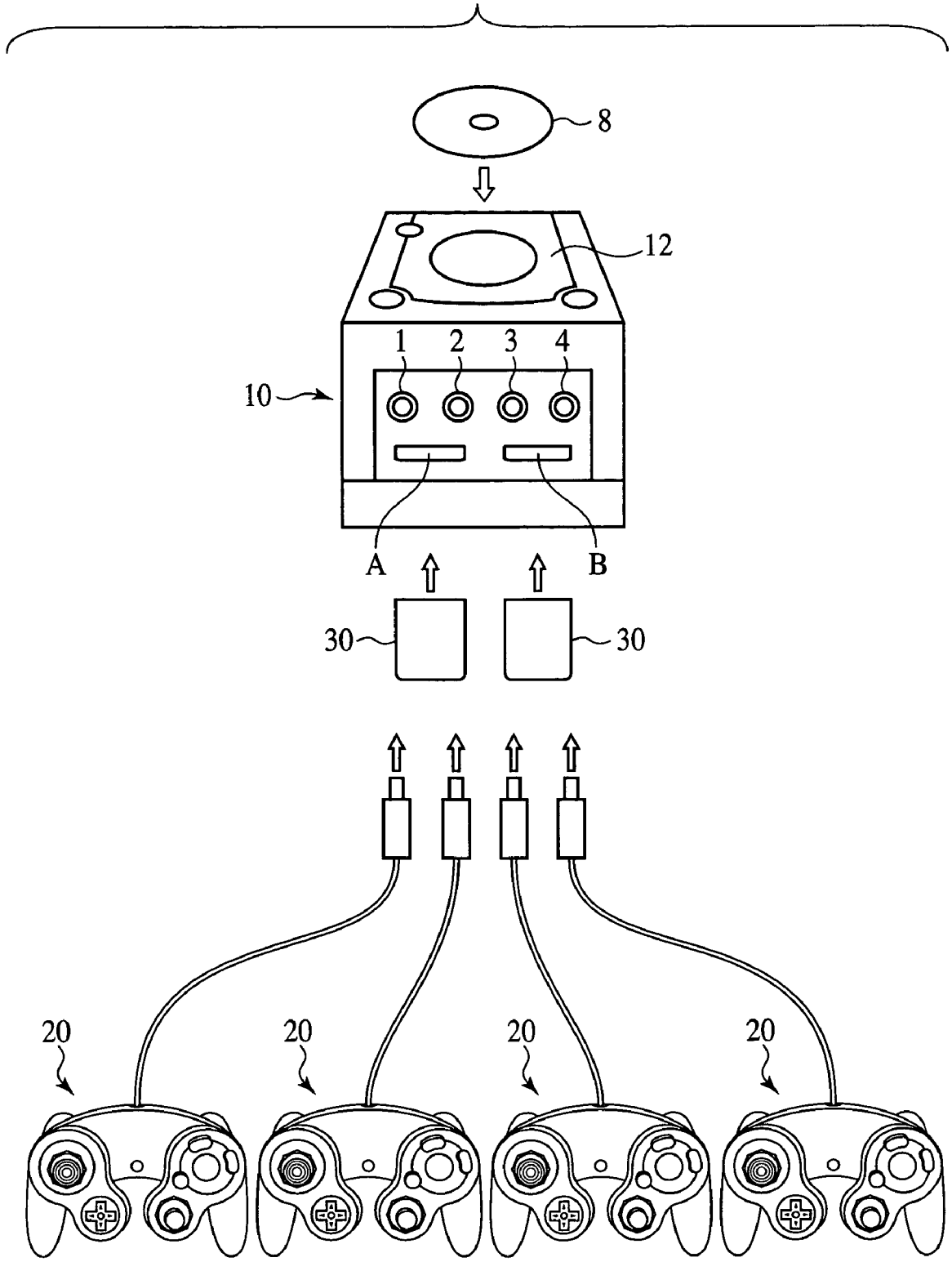
FIG. 1 is a diagrammatic view of the game apparatus according to one embodiment of the present invention.
Figure 2:
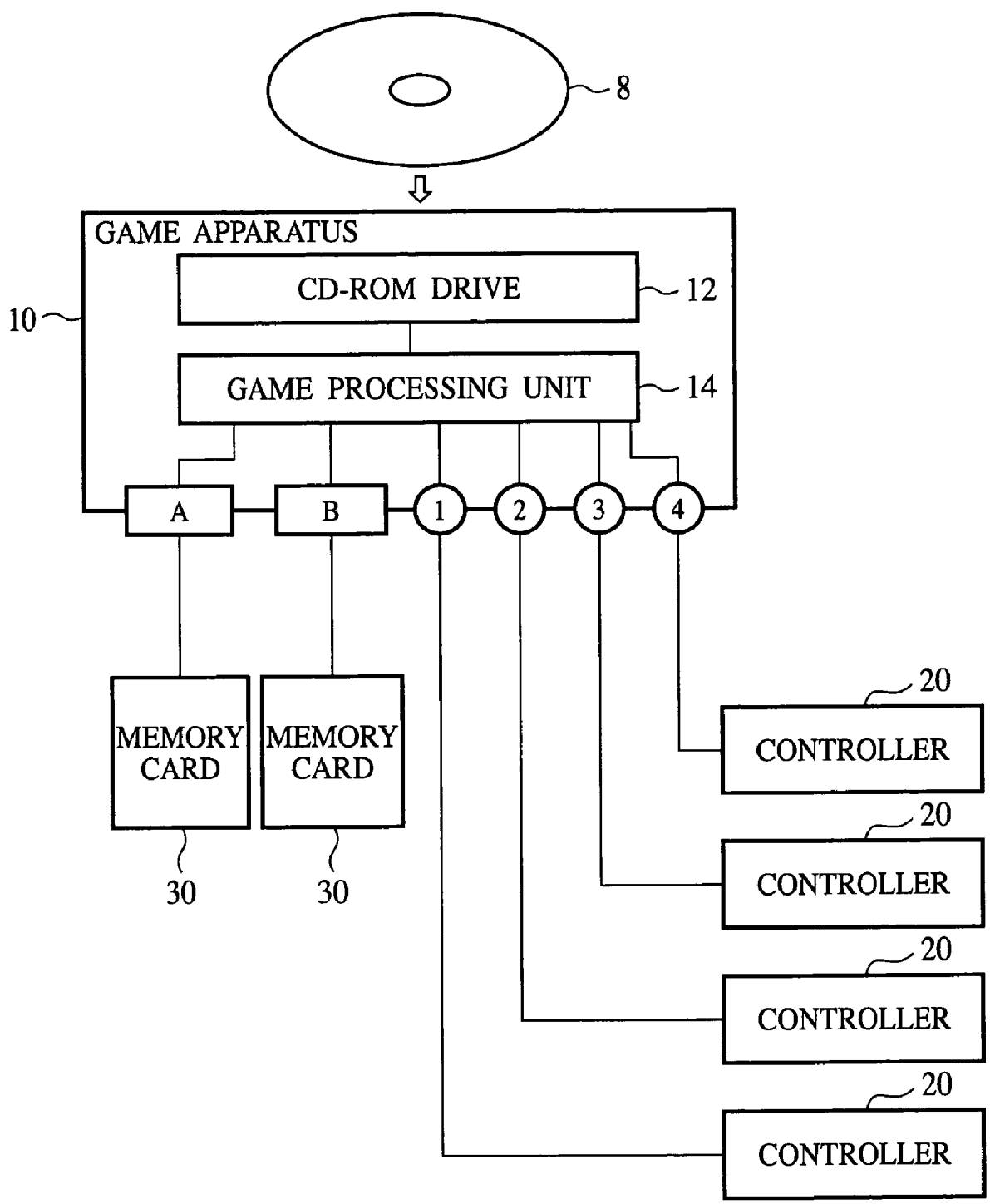
FIG. 2 is a block diagram of the game apparatus according to the embodiment of the present invention.

The game apparatus according to the present embodiment will be explained with reference to FIGS. 1 and 2. FIG. 1 is a diagrammatic view of the game apparatus according to the present embodiment. FIG. 2 is a block diagram of the game apparatus according to the present embodiment.

As illustrated in FIG. 1, the game apparatus body 10 is substantially cubic. On the upper side of the game apparatus body 10, a CD-ROM drive 12 for mounting a CD-ROM 8 storing a game program is provided. On the front side of the game apparatus body 10, four controller connectors 1, 2, 3, 4 and two memory slots A, B are disposed. Controllers 20 can be connected respectively to the controller connectors 1, 2, 3, 4. Memory cards 30 can be inserted respectively into the memory slots A, B.

As illustrated in FIG. 2, in the game apparatus body 10, a CD-ROM drive 12 for mounting the CD-ROM 8, and a game processing unit 14 for executing the game are provided. The four controllers 20 can be connected to the game processing unit 14 via the controller connectors 1, 2, 3, 4, and the two memory cards 30, i.e., the memory card 30 as a first storage medium and the memory card 30 as a second storage medium can be mounted on the processing unit 14 via the memory slots A, B.

In place of the CD-ROM 8, an 8 cm-diameter DVD-ROM or a 12 cm-DVD-ROM may be used, and a DVD-ROM drive may be used in place of the CD-ROM drive 12.

(Game Processing Unit)

Figure 3:
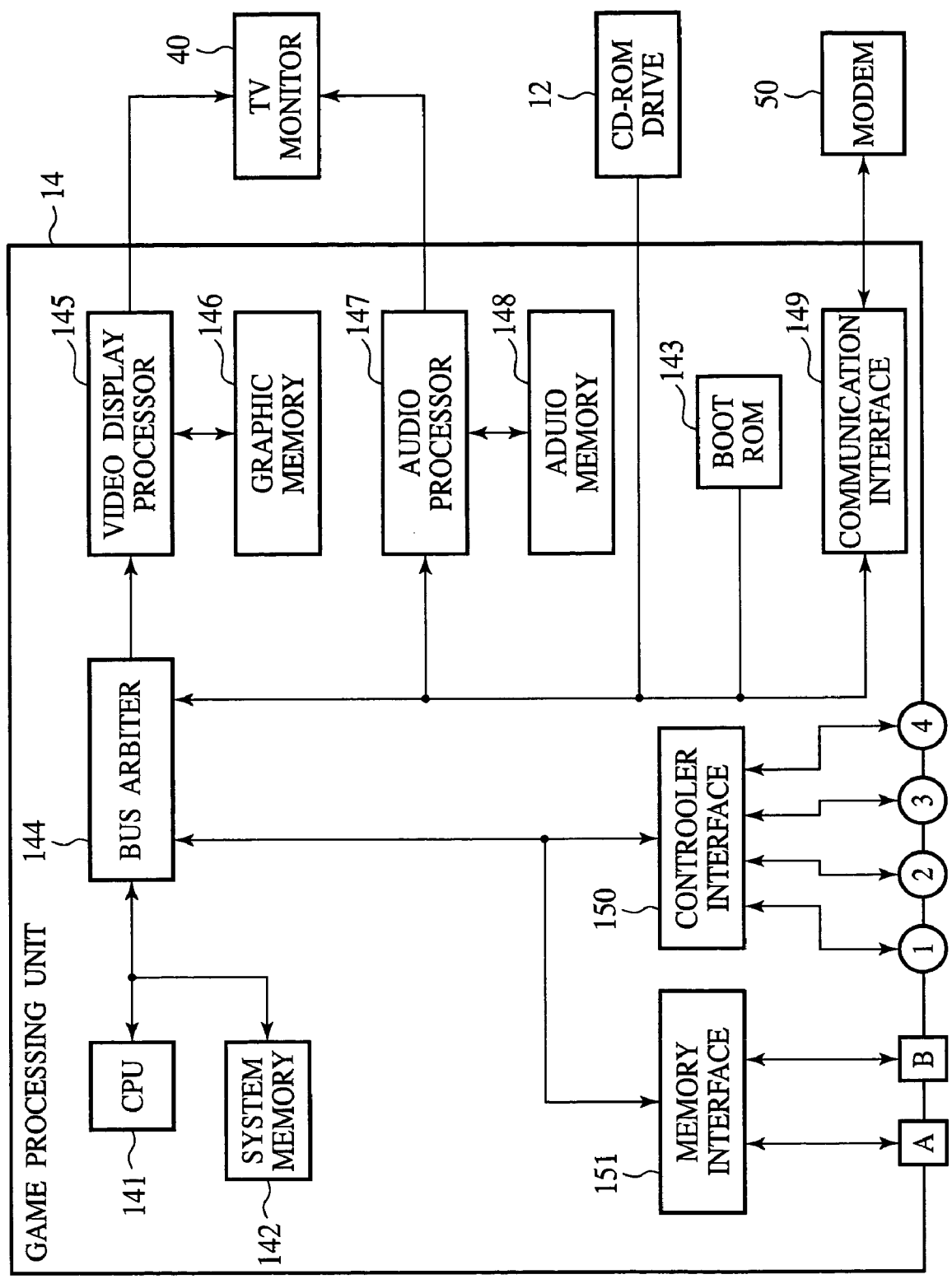
FIG. 3 is a block diagram of the game processing unit of the game apparatus according to the embodiment of the present invention.

The game processing unit 14 of the game apparatus illustrated in FIG. 2 will be detailed with reference to FIG. 3. FIG. 3 is a block diagram of the game processing unit 14 which is mainly for the game apparatus for the consumer use.

The game processing unit 14 controls the respective blocks and comprises a CPU 141 which computes display positions, sizes, etc. of objects to be displayed on the screen, a system memory 142 which stores programs data used by CPU 141, a BOOTROM 143 which stores BOOT programs which actuate the game apparatus after a power injection and a reset, a bus arbiter 144 which controls buses transmitting the programs and data between the respective blocks, a video display processor 145 which produces images, a graphic memory 146 which is connected to the video display processor 145 and stores data for forming images and images to be displayed, an audio processor 147 which produces sounds, an audio memory 148 which is connected to the audio processor 147 and stores data for producing sounds and sounds to be outputted, a communication interface 149 which transmits and receives programs and data to and from electronic deices outside the game apparatus, a controller interface 150 which receives operation signals from the controllers operated by players and outputs the operation signals to the CPU, and a memory interface 151 which transmits and receives programs and data to and from the controller interface 150.

The video display processor 145 and the audio video processor 146 are connected to a TV monitor 40. A modem 50 is connected to a communication interface 149. The game processing unit 14 is connected to an outside network via the communication interface 149 and the modem 50. The memory cards 30 store results of the game where the game is paused, and when said game is resumed in the next play, the results are read, whereby the game can be resumed.

(Memory Cards)

Figure 4:
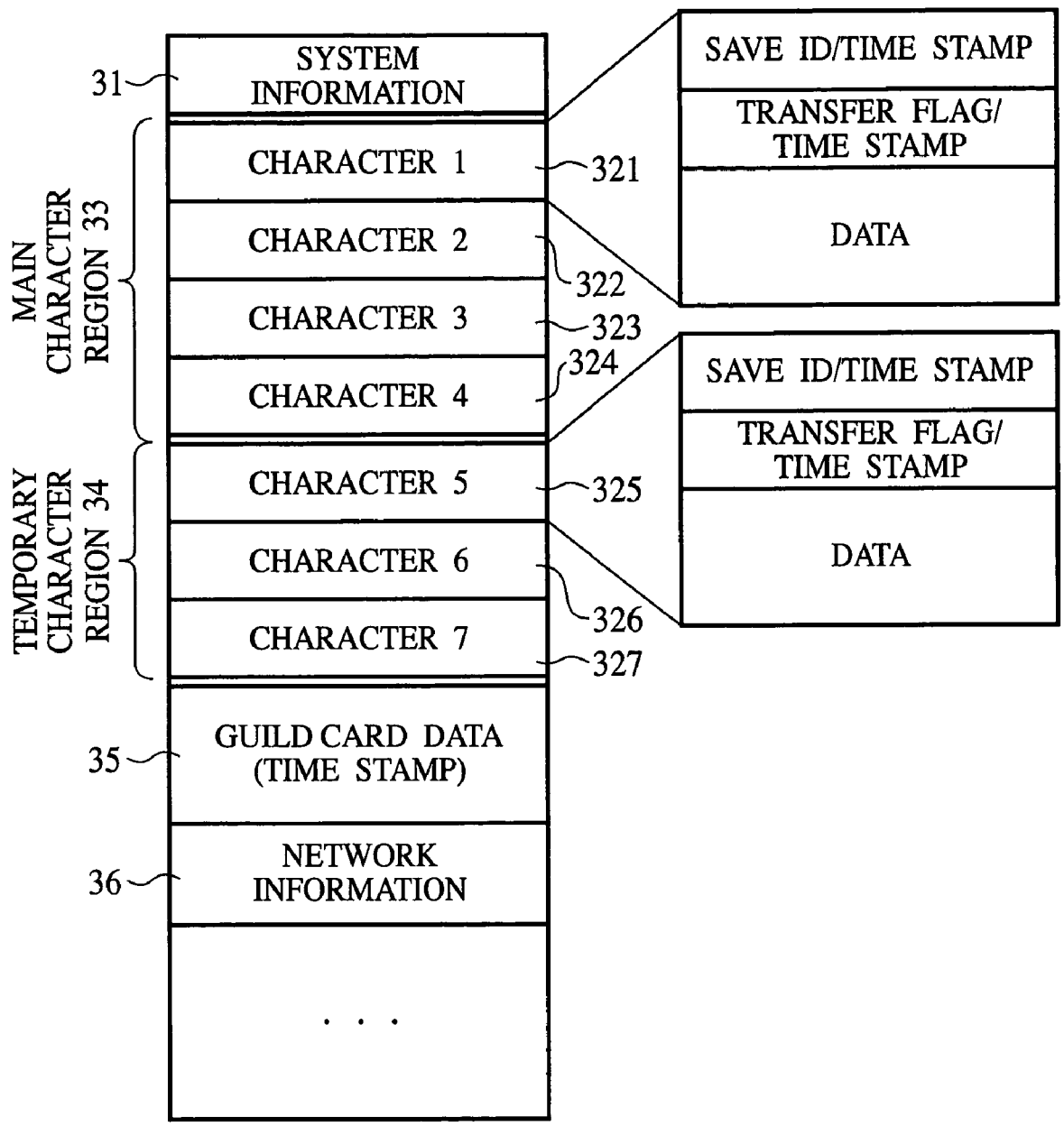
FIG. 4 is a view of the memory structure of the memory card used in the game apparatus according to the embodiment of the present invention.

Each memory card 30 used in the game apparatus according to the present embodiment will be explained with reference to FIG. 4. FIG. 4 is a view of the memory structure of each memory card 30.

Each memory card 30 includes a system region 31 which stores system information, a character data region 32 which stores character data, a guild card region 35 which stores guild card data, a snap region 36 which stores snap files, a network region 37 which stores network information, etc.

In the present embodiment, a character region 32 includes regions 321-327 which can store data of seven characters, and the regions 321-324 which store data of the characters 1-4 are a main character region 33, and the regions 325-327 which store data of the characters 5-7 are a temporary character region 34.

The main character region 33 stores character data of a player owning the memory card 30, and the temporary character region 34 stores character data copied from another backup memory. With the main character region 33 and the temporary character region 34 of each memory card 30, the multimode game is played.

Each character data includes a save ID which is an ID at the time when a character has been produced, an on-trip (in-transfer) flag indicating the character is on trip (in-transfer) to another backup memory, and data of character information. A time stamp indicating the time information at the time when the character has been produced is appended to the save ID. A time stamp indicating the time information at the time when the character has tripped (moved) is appended to the on-trip (in-transfer) flag.

In the guild card region 35 as well, a time stamp at the time when the guild card has been produced is appended to the guild card region 35.

(Outline of the Game)

The game played on the game apparatus according to the present embodiment will be summarized. The game program is stored in the CD-ROM 8. The CD-ROM 8 is mounted on the CD-ROM drive 12 of the gate apparatus body 10, and the game program is read. Whereby the game processing unit 14 can execute the game.

In the online mode, the respective players connect the controller 20 to the controller connector 1 and insert his own memory card 35 into the memory slot A, and connect the game apparatus body 10 to the communication network to connect the server (not shown). The respective players execute the online game with other players making a team.

In the single mode in which one player plays the game in the online mode, the player connects the controller 20 to the controller connector 1 and inserts his own memory card 30 into the memory slot A, and plays the offline game without connecting the game apparatus body 10 to the communication network.

In the multimode in which a plurality of players play the game in the offline mode, usually the respective players bring in their own controllers 20 and memory cards 30 to play the game on one game apparatus.

However, as illustrated in FIGS. 1 and 2, the game apparatus body 10 of the present embodiment has four controller connectors 1, 2, 3, 4 but has only two memory slots A, B. The memory cards 30 the players have brought cannot be often inserted in the gate apparatus body 10 at once. To play the game in the multimode, the present embodiment has various contrivances.

There are risks that the game players may use the multimode in the offline mode to unfairly obtain items from their friends, and the game players may use friends' game data to unfairly power up their own characters. To prevent such risks in the multimode, the present embodiment has various contrivances.

(Outline of the Multimode)

Figure 5:
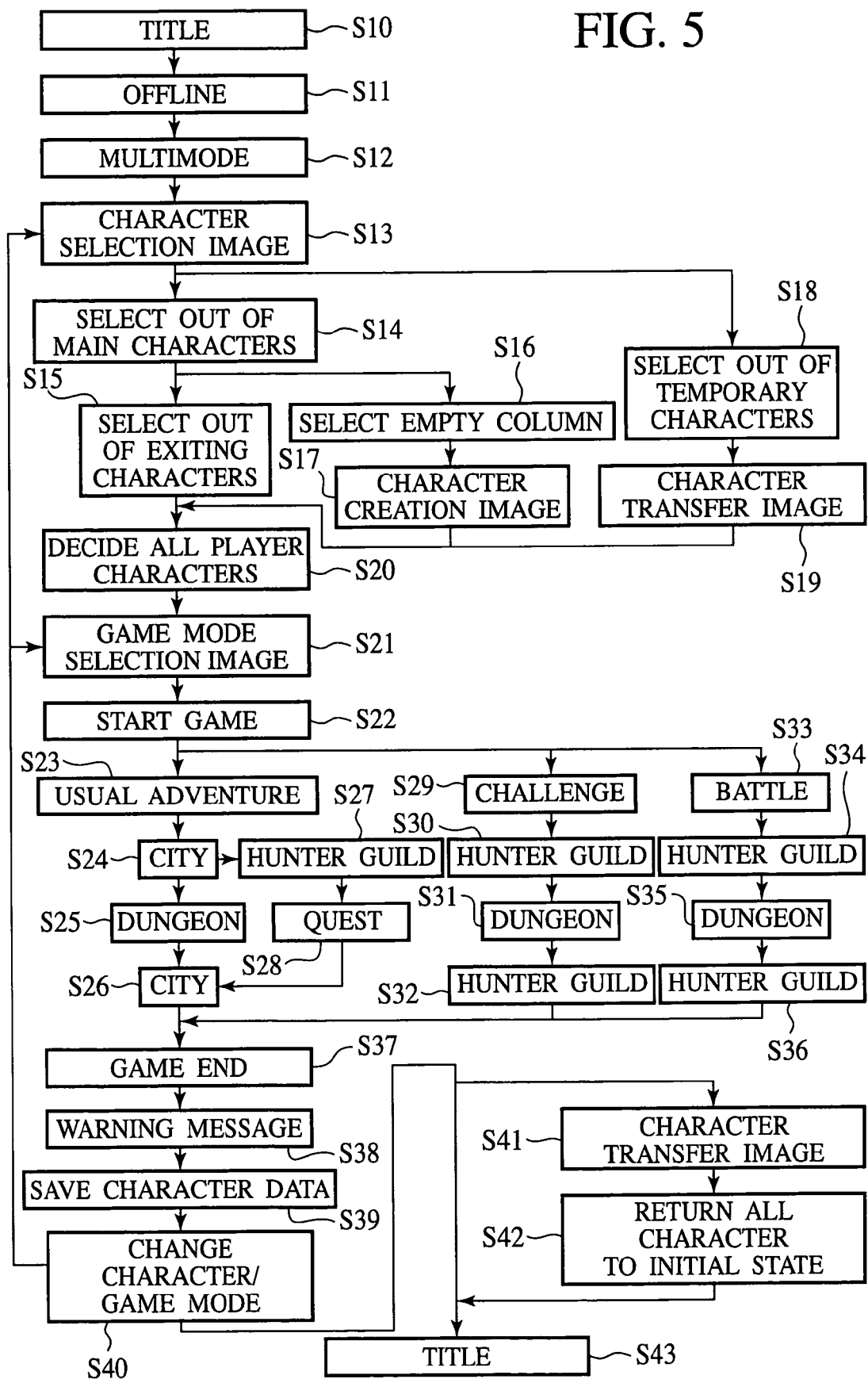
FIG. 5 is a flow chart of the multimode of the embodiment of the present invention.

The multimode played on the game apparatus according to the present embodiment will be summarized with reference to FIG. 5. FIG. 5 is a flow chart of the multimode.

(Select the Multimode)

In the display of the title image (Step 10), offline is selected in the online/offline selection image (Step S11), and then multimode is selected in the single mode/multimode selection image (Step S12). Thus, the multimode is established.

(Select Character Data)

As illustrated in FIG. 4, one memory card 30 can store data of up to four characters as the main characters. The multimode can be played, using the character data as the main characters.

In the multimode, character data transferred from another memory card 30 can be used. In this case, another memory card 30 is inserted into the memory slot B to transfer the character data to the memory card 30 inserted in the memory slot A.

The character selection image is displayed (Step S13), and a character to be used as the main character is decided (Step S14). The main character may be selected out of the existing main characters (Step S15), or an empty one of the main character regions of the memory card 30 is selected (Step S16), and a new character may be produced (Step S17).

When a main character of another memory card 30 is used, said another memory card 30 is inserted into the memory slot B, and a temporary character to be used is selected out of the main characters stored in said another memory card 30 (Step S18) and is transferred to a temporary character region of the memory card 30 inserted in the memory slot A (Step S19).

When the characters of all the players are thus decided (Step S20), the game of the multimode is started.

(Select a Game Mode)

In the same way as in forming a team in the online mode, a game mode is selected (Step S21). As a difficulty of the game, either of normal/hard/very hard/ultimate is selected, and as a game mode, either of usual adventure/challenge/battle is selected.

The difficulty of the game is agreed with either of the participating characters, whose level is lowest. When characters of low levels are contained, the high difficulty, such as the ultimate mode, cannot be selected.

In the same way as in the online mode, Player 1 is the leader (host), and the flags and the section IDs are matched.

(Execute the Game)

In accordance with the selected mode, the game of the multimode is started (Step S22). Each game mode comprises a plurality of stages.

The usual adventure (Step S23) has the stages of a city (Step S24), a dungeon (Step S25) and a city (Step S26), and the additional stages of a hunter guild (Step S27) and a quest (Step S28).

The challenge mode (Step S29) has the stages of a hunter guild (Step S30), a dungeon (Step S31) and a hunter guild (Step S32).

The battle mode (Step S33) has the stages of a hunter guild (Step S34), a dungeon (Step S35) and a hunter guild (Step S36).

(Divide Screen in the Multimode)

The screen is automatically divided in accordance with a number of the characters taking part in the game; when two characters take part in, the screen is bisected; and when four characters take part in, the screen is quartered. When three characters take part in, the screen may be trisected, or the screen may be quartered but one of the quartered sections is not be used.

(Restrict Bringing In/Out Data)

Bringing in/out data in the multimode is partially restricted so as to prevent unfair copy and unfair multiplication of the items.

In the multimode, all the status data, such as level, etc., of the character data can be brought in. In the multimode, added status can be brought out after the game is over.

As for the item data, in the multimode, equipments of the characters can be brought in. However, the equipments cannot be left for the other players to pick up them. In the multimode, the exchange of the items is prohibited to prevent the multiplication of the items. In the multimode, items obtained in the multimode game can be brought out. Items obtained in the multimode game can be exchanged with the items of the other players.

As for money (meseta), in the multimode, it is prohibited to bring in money from the outside. On the other hand, money obtained in the multimode game can be freely brought out.

The equipments of the characters can be brought in, but items other than the equipments of the characters, e.g., items held by the characters in the hands, items related to the characters, items not related directly to the characters, etc. may be brought in.

Only data of items which can be brought in is copied. However, it is possible that data of all items are copied, flags indicating that the respective items are usable or unusable are provided to the respective items, and the flags are on/off to discriminate the usable items from the unusable items.

(Function of the City)

In the multimode, a certain restriction is applied to the function of the city. As in the online mode, shops can be used, and a connoisseur can be also used. The guild counter can be used only in the challenge mode and the battle mode. The medical center can be used.

The checkroom can be used only to check in items but the items checked in cannot be checked out, so that the unfair transfer of the items among the players is prevented.

(Move Between Maps)

Between the maps, basically, the movement cannot be made unless all the characters are together.

As for the movement device in the city, when all the characters are on board, a dungeon list is displayed, and the player of a character who lastly went on board selects/decides a map, and the movement is made.

As for the movement device in the dungeon, all the characters are on board, and one player pushes button A. Then, the movement is made. Unless all the characters are on board, the movement is not made.

The movement of the movement device special for the boss is the same as that of the movement device in the dungeon described above. No warning window is displayed, as is in the single play.

As for a ryuca, when one character enters the ryuca, a window "Return to City Yes/No" is displayed. When "Yes" is selected, all the characters return to the city. When returning from the city, all the characters are on board and push the A button. Then, the movement is made.

When any character is died, a window "Return to City Yes/No" is displayed. When "Yes" is selected, all the characters return to the city.

(End the Game)

When the respective stages of the respective game modes end, the multimode game is finished (Step S37). Subsequently, a warning message is displayed (Step S38), and then the character data is saved in the memory card 30 (Step S39).

When the character/game modes are changed (Step S40), the step is returned to Step S13 (Select characters) or Step S21 (Select a game mode).

When the character/game modes are not changed, the character data stored in a temporary character region is transferred to the initial memory card 30 (Step S41). When the transfer is completed for all the characters (Step S42), the title image is displayed, and the game ends (Step S43).

(Transfer Character Data)

The transfer of the character data in the game apparatus according to the present embodiment will be explained with reference to FIGS. 6 and 7.

(Transfer Character Data)

In the multimode, the data of the main character of another memory card 30 is read in to use. In this case, the memory card 30 to be used in the game is inserted in the slot A, and in the slot B, said another memory card 30 is inserted into to transfer the character data.

FIG. 6A illustrates an image for selecting a character in the multimode. On the left side of the image, the temporary character region 34 of the memory card 20 inserted in the slot A is displayed, and on the right side of the image, the main character region 33 of the memory card 30 inserted in the slot B is displayed.

In the example illustrated in FIG. 6A, the first region of the temporary character region 34 of the memory card in the slot A, displaced on the left side of the image, i.e., the region 325 of the character 5 is selected, and the first region of the main character region 33 of the memory card in the slot B, displayed on the right side of the image, i.e., the region 321 of the character 1 is selected. When the execution button is pushed, the character data stored in the region 321 of the character 1 is transferred to the region 325 of the character 5 in the slot A.

As illustrated in FIG. 6A, at the center of the screen, a warning "In transfer. Don't insert in/out the memory card" is displayed, and at the bottom of the screen, a warning "The character data transferred to the memory card in the slot A cannot be used until the data is returned to the initial memory card." is displayed.

When the character data of the memory card 30 in the slot B is stored in the memory card 30 in the slot A as the temporary character data, the in-transfer flag of the character data in the memory card 30 in the slot B is turned on to make the character data unavailable. The initial character data remains in the memory card 30 in the slot B but is made unavailable by turning on the in-transfer flag.

(Identify Character Data)

In the present embodiment, when a new character data is prepared, the information of the time is recorded as a time stamp. Also when character data is transferred from the slot B to the slot A, the in-transfer flags both the transferrer character data and the transferee character data are turned on, and the time of the transfer is recorded as a time stamp. Based on these two time stamps, the character data are identified.

(Transferrer Character Data)

Even when the memory card 30 of the transferrer is mounted on another game apparatus 10 to play the game, using the transferred character data, the in-transfer flag is on, and the game cannot be played. However, players often forget to return the data to the initial memory card 30. In such case, it is not practical to make the transferred character data unavailable.

Then, in the present embodiment, the "in-transfer flag" can be removed under the condition of "character data grown in the multimode is not returned to the transferee".

FIG. 6B is an image of selecting a character. The initial memory card 30 is inserted into the slot A of another game apparatus 10, and the character data in transfer is selected. Then, at the center of the screen, "This character is "in transfer" to another memory card as a temporary character. "In transfer" can be released, and then the data in transfer cannot be returned to this memory card. Is it all right?" is displayed. A selection image "Yes, No" is displayed.

Then, when "Yes" is selected, the in-transfer flag of the character data in the region 321 of the character 1 of the memory card 30 is turned off, concurrently the time stamp being deleted. Thus, the character data can be used as the usual character date.

(Transferee Character Data)

Usually, after the game is over, the character data stored in the temporary character region 34 of the transferee memory card 30 is returned to the initial memory card 30. However, it can happen that the initial memory card 30 cannot be found at hand in circumstances. It is not practical that in such case, the character data cannot be returned to the initial memory card.

Then, in the present embodiment, for the temporary character data which has lost the transferrer in some circumstances, "Return to initial memory card", "Delete" or others can be selected on the character selection display of the multimode.

Figure 7:
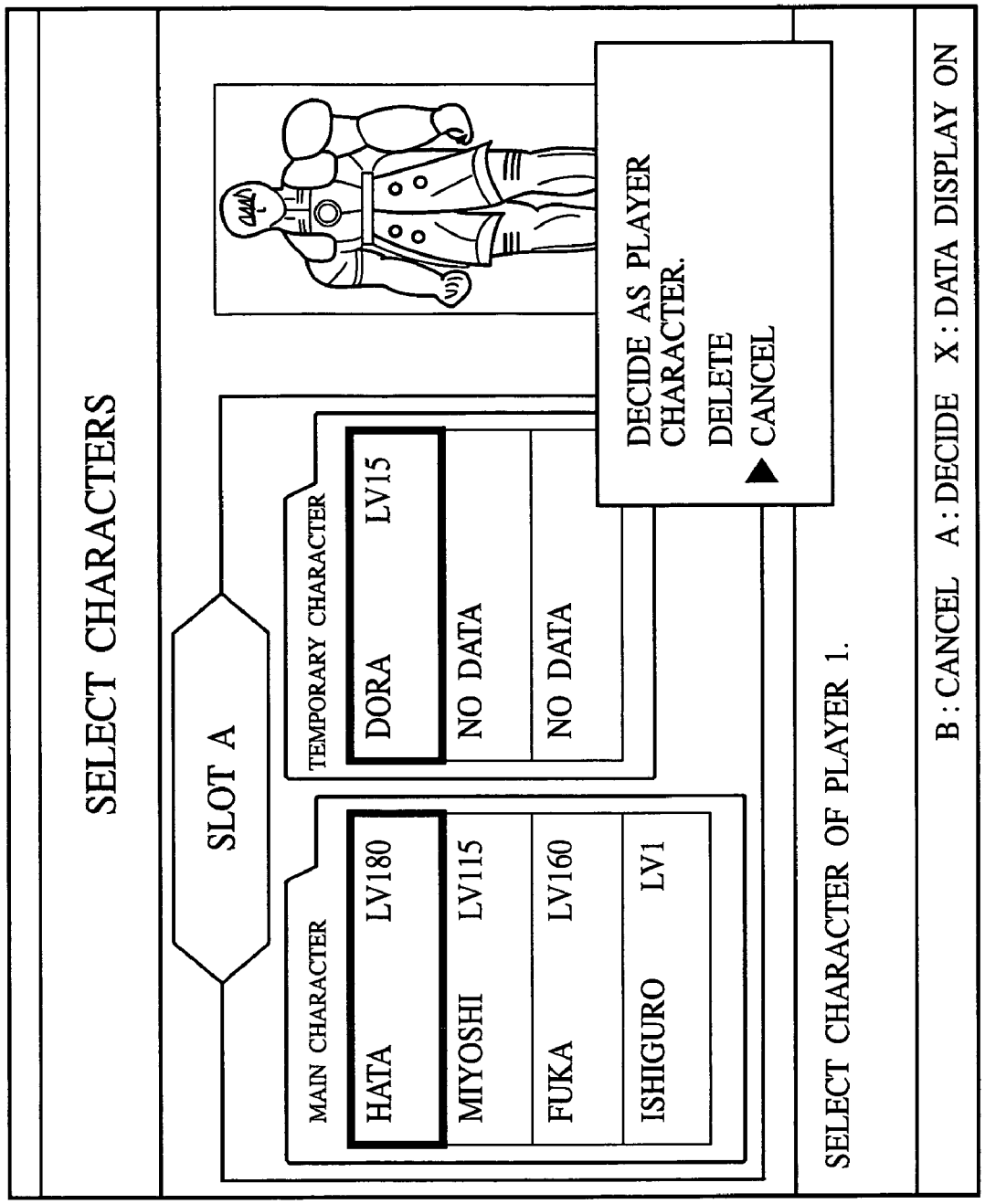
FIG. 7 is views of images for the operation of transferring character data of the embodiment of the present invention (Part 2).

FIG. 7 is an image for the character selection. The memory card 30 is inserted in the slot A of the game apparatus 10, and the main character region 33 and the temporary character region 34 are displayed. Here, when the temporary character region is selected, for the temporary character, a window "Decide the character as player's character, Return the character to the initial memory card, Delete, or Cancel" is displayed, and the player selects one of them.

When "Decide the character as player's character" is selected, the data of the temporary character is decided as it is as the data of the player character. When "Return to the memory card" is selected, the image of the transfer to the slot B illustrated in FIG. 6A is displayed. In the transfer image, the player returns the temporary character data to the initial memory card. When "Delete" is selected, a confirmation display "Really delete? Yes or No" is displayed. In the confirmation display "Yes" is selected in, and the character data is deleted. When "Cancel" is selected, the image is returned to the image previous to the image illustrated in FIG. 7.

(Select Characters)

The operation of selecting characters in the game apparatus according to the present embodiment will be explained. An example of the character selecting operation of the Steps S13 to S20 of the flow chart of FIG. 5 will be explained with reference to the images of FIGS. 8 to 16.

In the present embodiment, a player who operates the controller 20 connected to the controller connector 1 is Player 1. Players who operate the controllers 20 connected to the controller connectors 2, 3, 4 are sequentially Player 2, Player 3 and Player 4.

(Select Character of Player 1)

Figure 8B:
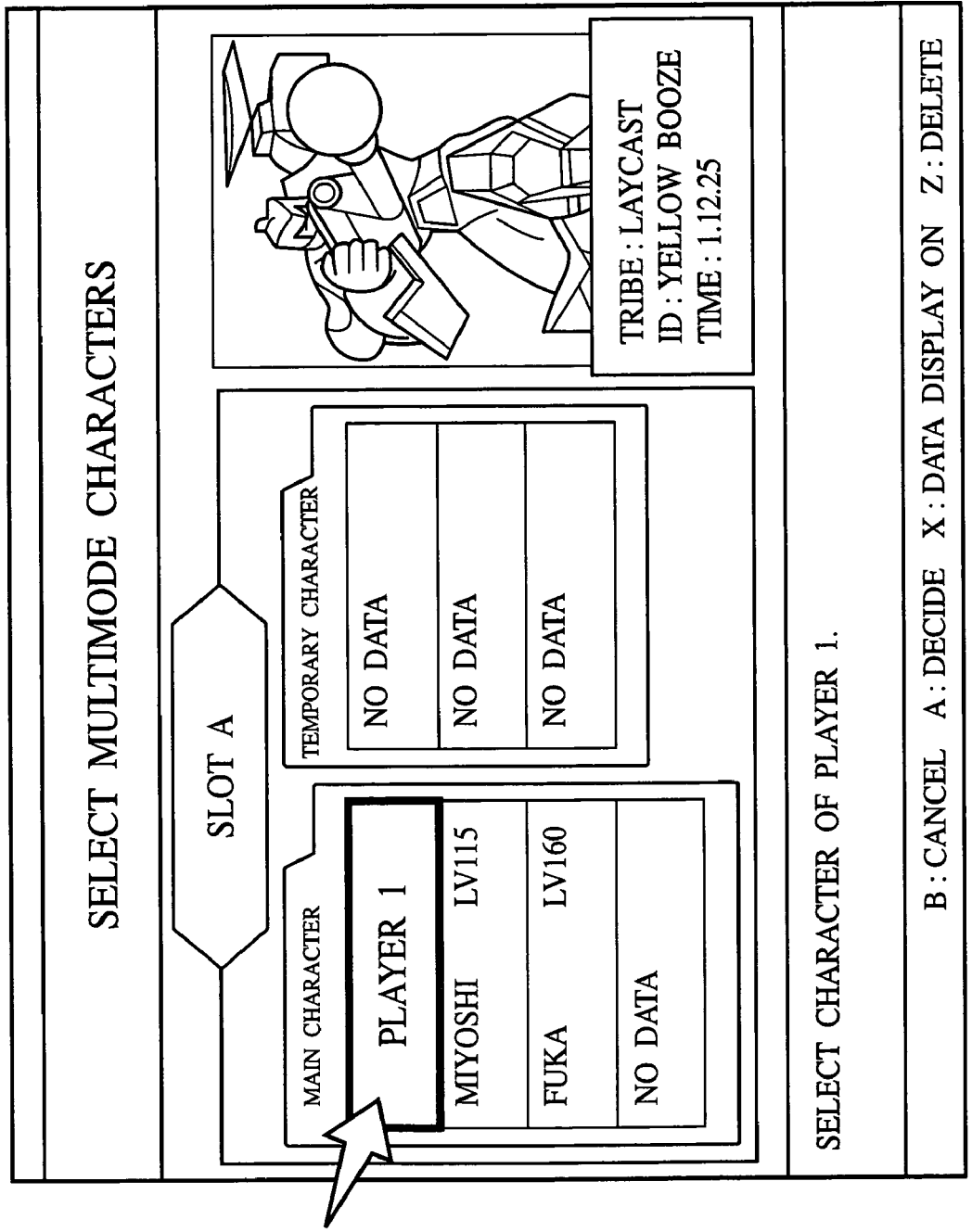
FIG. 8 is views of images for the operation of selecting character data of the embodiment of the present invention (Part 1).

First, a character of Player 1 is selected (FIGS. 8A and 8B).

As illustrated in FIG. 8A, the cursor is placed on an arbitrary character in the main character region 33. In FIG. 8A, the cursor is placed on the region 321 of Character 1. Characters 1-4 in the main character region 33 or Characters 5-7 can be selected here as long as character data are present. P. 17

Then, the decision button A of the controller is pushed, and then as illustrated in FIG. 8A, the character data with the cursor placed on, the data of the region 321 of the Character 1 here, is decided as the character data of Player 1.

(Select Character of Player 2 (Produced New))

Figure 9A:
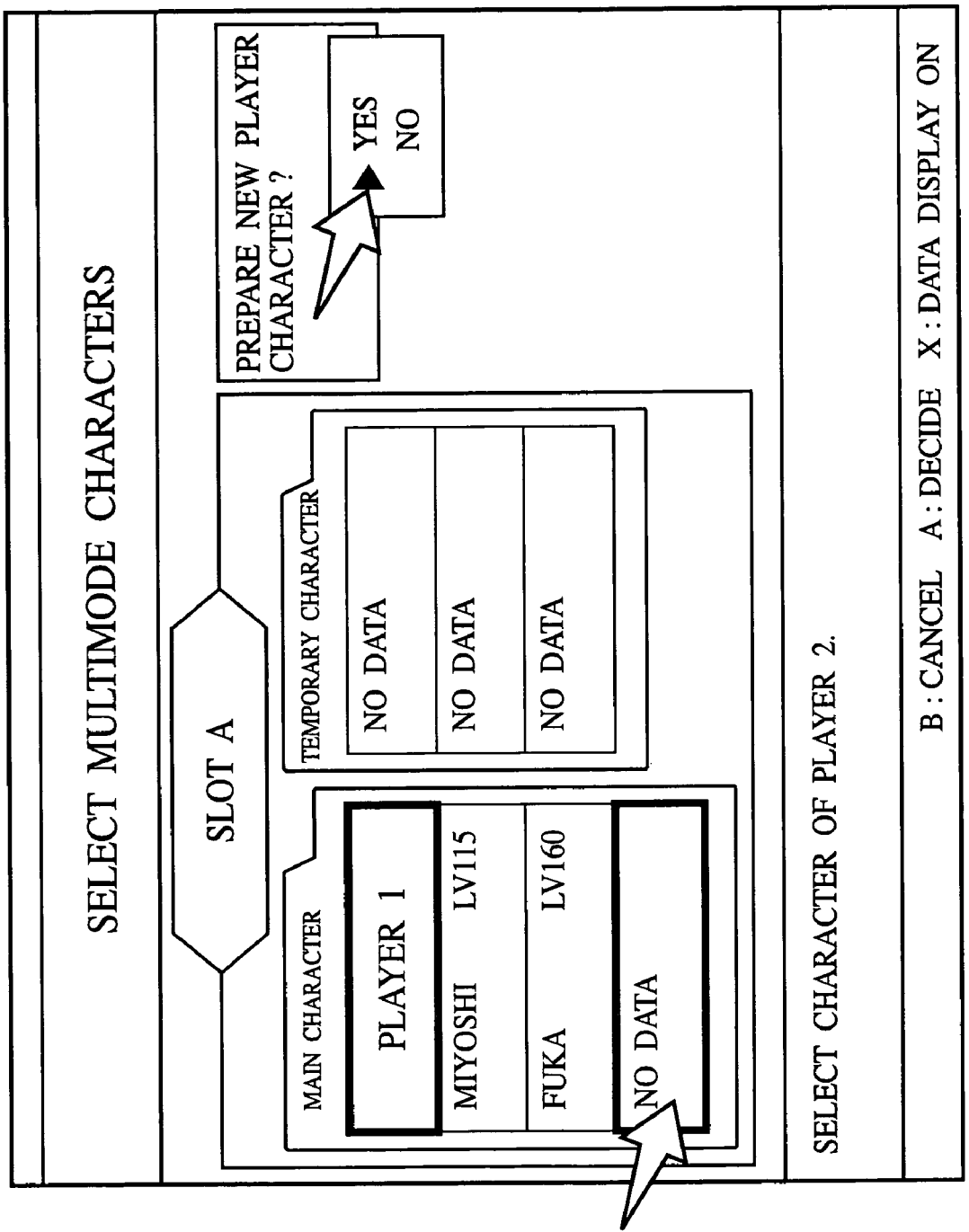
FIG. 9 is views of images for the operation of selecting character data of the embodiment of the present invention (Part 2).
Figure 9B:
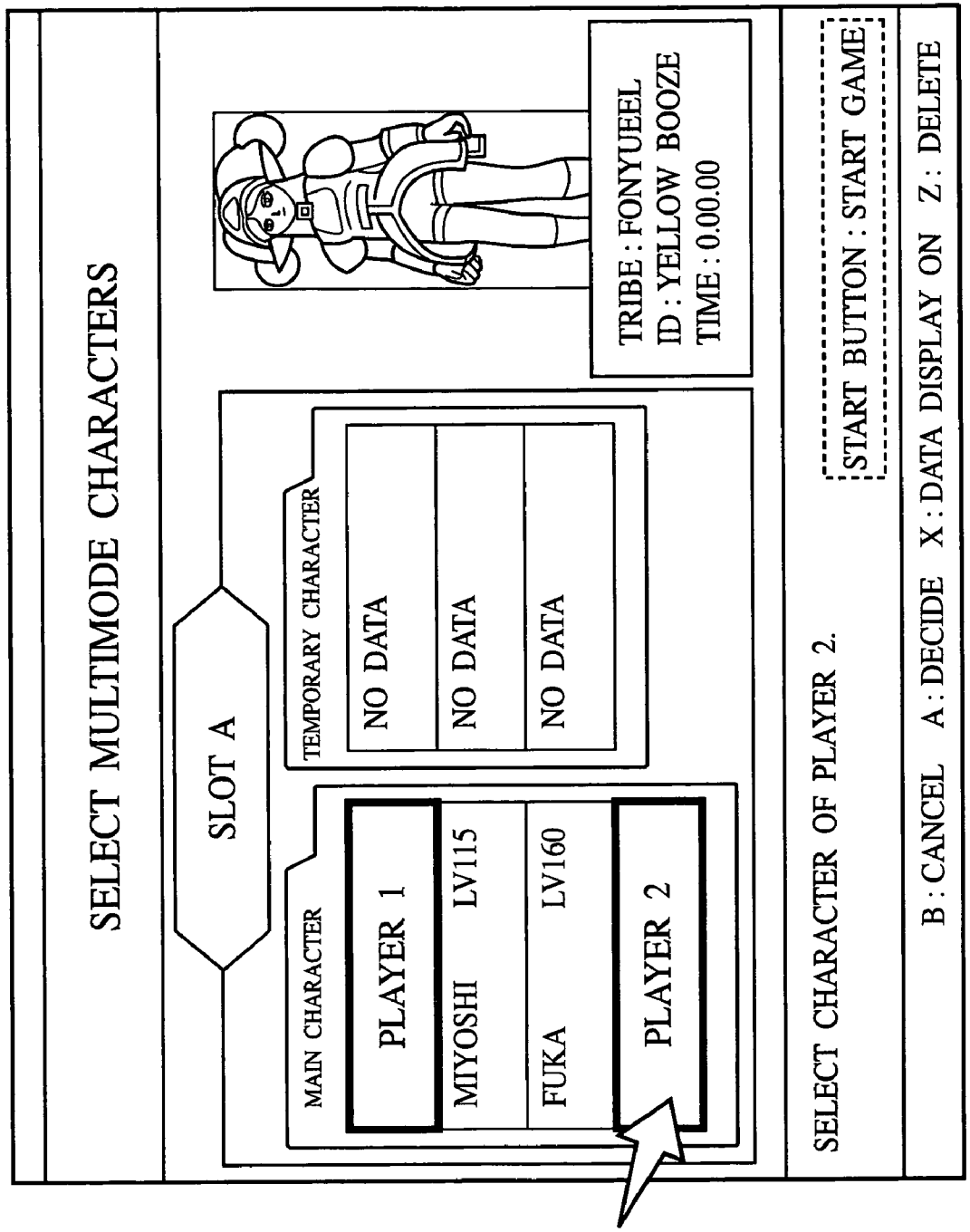

Then, a character of Player 2 is selected (FIGS. 9A and 9B). The controller 20 connected to the controller connector 2 is operated.

As illustrated in FIG. 9A, the cursor is placed on the region of the main character region 33 indicated with "NO DATA", e.g., the region 234 of Character 4, and the decision button A of the controller 20 is pushed.

Subsequently, the character producing image follows, and the character of Player 2 is produced new. Various parameters of the character are decided to produce the character, and the image is returned to the character selection image illustrated in FIG. 9B. The cursor is placed on the region 234 of Character 4, and the decision button A of the controller 20 is pushed. Then the character of Player 2 is decided.

Only the character data produced new by Player 2 in the multimode can be deleted by Player 2.

(Display Start Button)

Figure 10A:
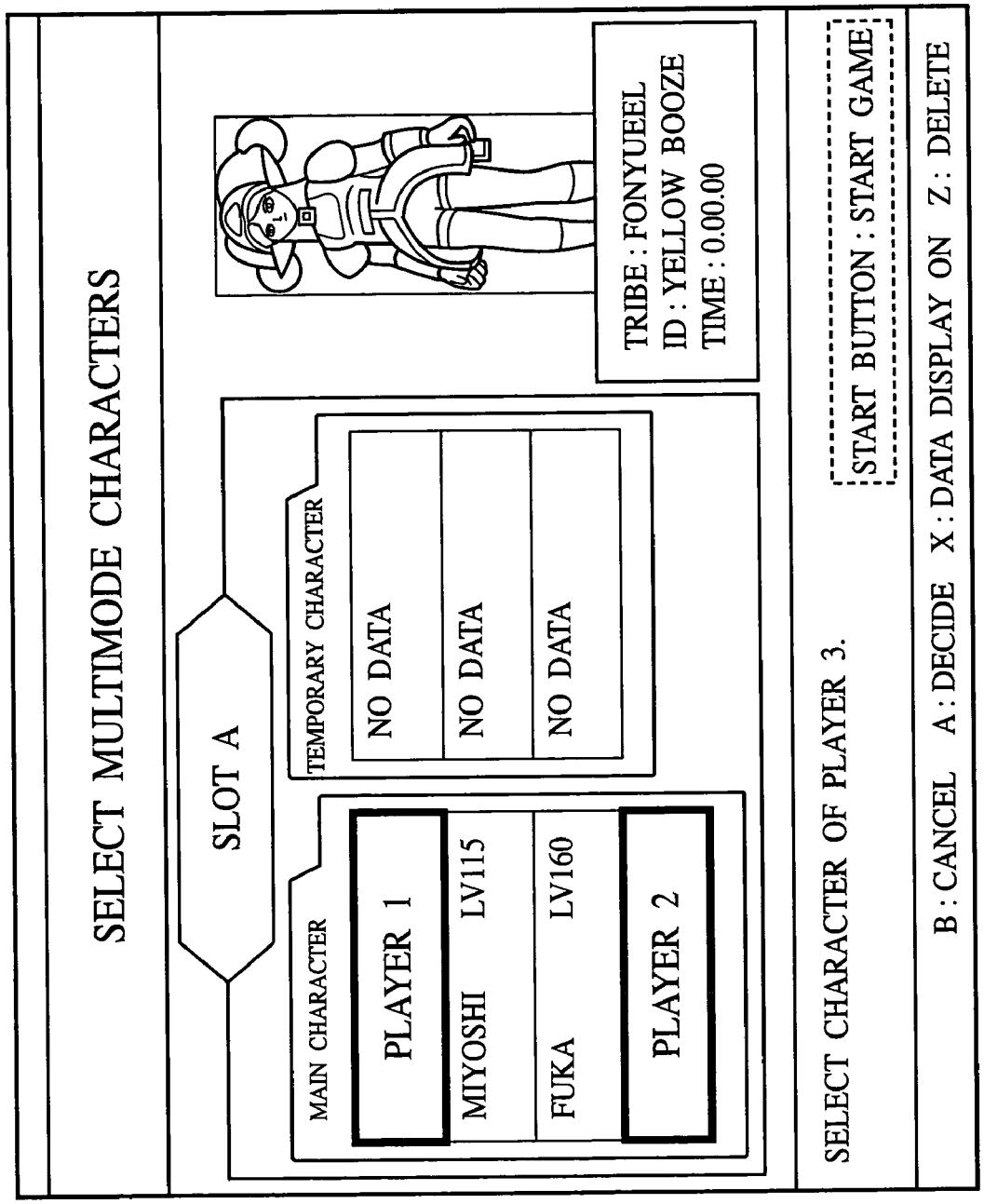
FIG. 10 is views of images for the operation of selecting character data of the embodiment of the present invention (Part 3).
Figure 10B:
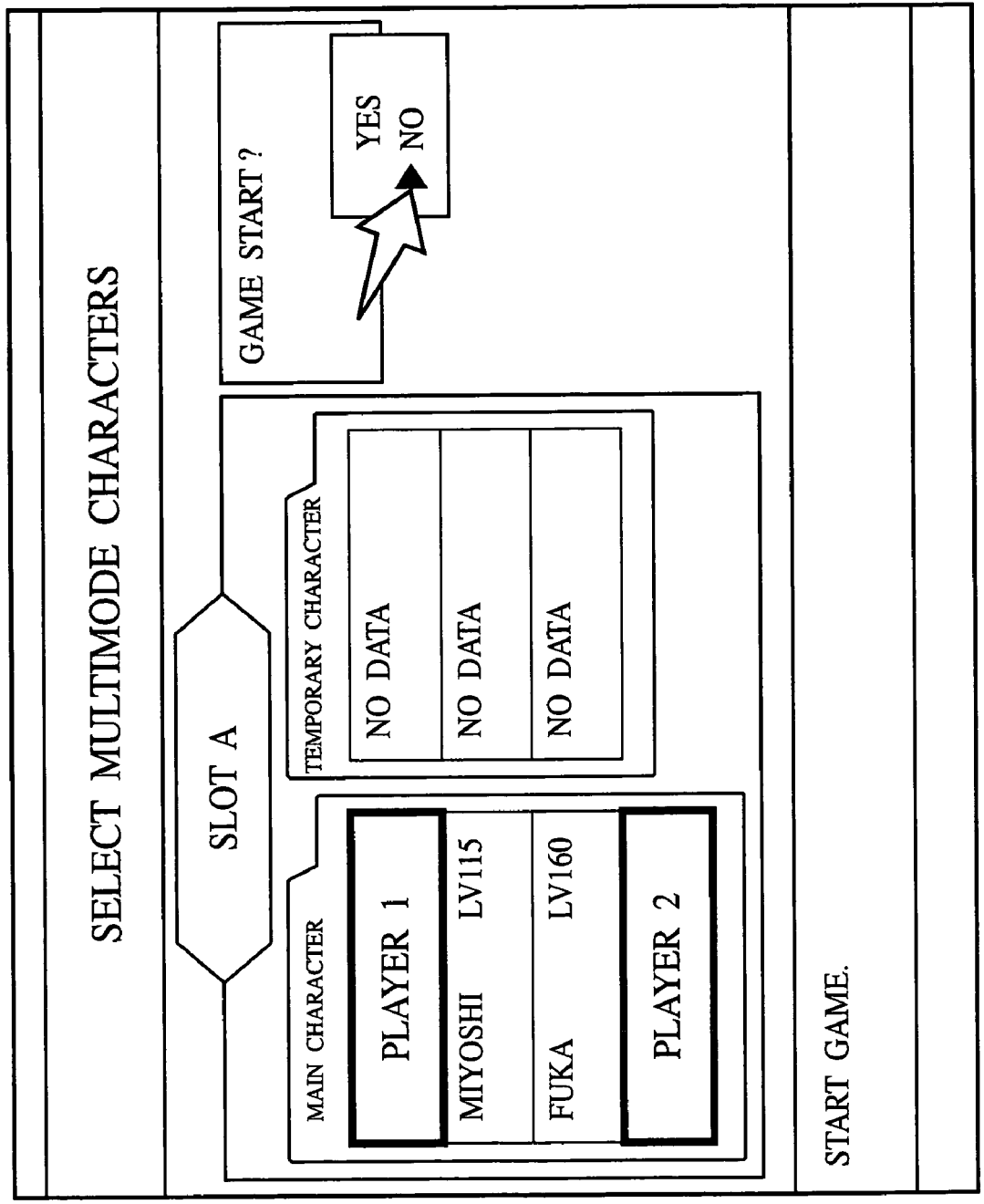

When characters of two or more players are decided, the game can be played in the multimode, and as illustrated in FIG. 10A, an indication "Start button: Start Game" is displayed on the screen. When the start button is pushed here, as illustrated in FIG. 10B, "Game start?" and "Yes/No" are displayed. When "Yes" is selected here, the game is started by two players. In the following, "No" is selected to select a character of Player 3.

(Select Character of Player 3 (Temporary Character))

Then, a character of Player 3 is selected (FIG. 11A-FIG. 14B). The controller 20 connected to the controller connector 3 is operated.

Figure 11A:
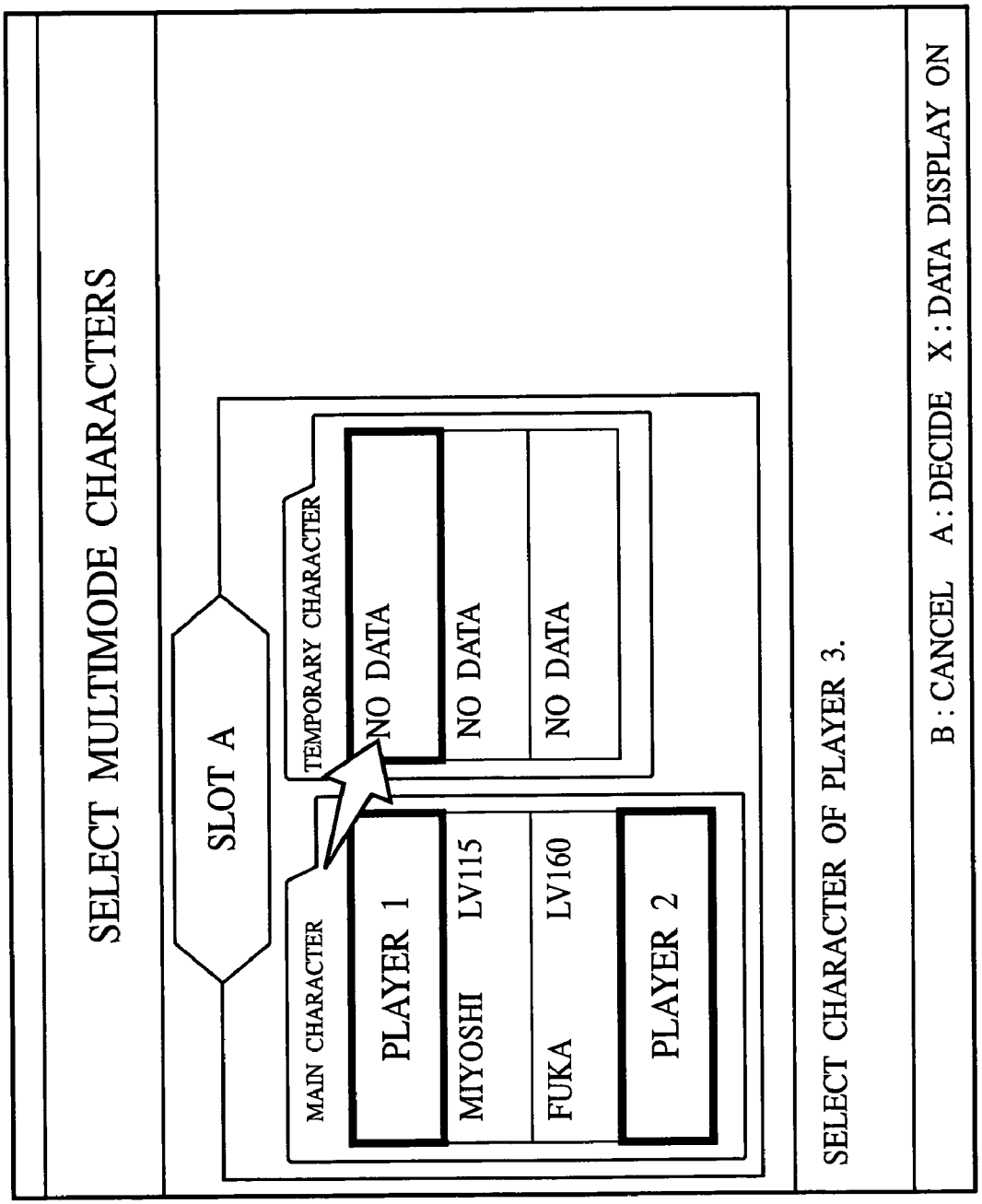
FIG. 11 is views of images for the operation of selecting character data of the embodiment of the present invention (Part 4).

As illustrated in FIG. 11A, the cursor is placed on the region of the temporary character region 34 of the slot A, where "NO DATA" is indicated, the region 235 of Character 5, and the decision button A of the controller 20 is pushed. Then, the image of the slot B illustrated in FIG. 11B follows. The part of the main character region 33 of the slot A is slided left, and the image of the slot B appears. When the memory card 30 is not inserted in the slot B here, as illustrated in FIG. 11B, "No memory card inserted. Insert memory card with character data" is displayed.

When the memory card 30 is inserted in the slot B, as illustrated in FIG. 12A, the indicator of the slot B is brightened to indicate that the memory card 30 is inserted, and "Loading" is displayed to indicate that the data in the memory card 30 is being loading.

Figure 12B:
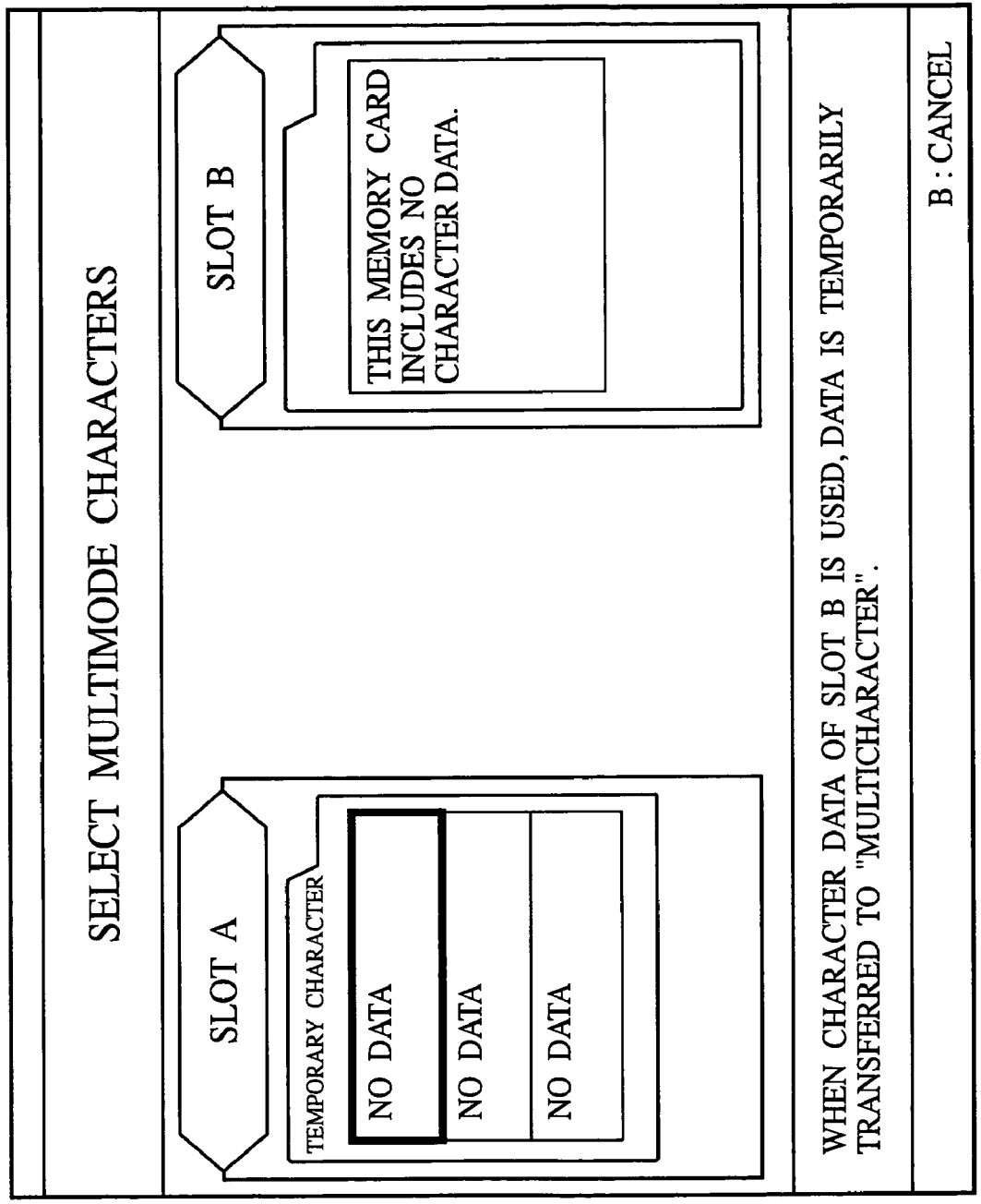
FIG. 12 is views of images for the operation of selecting character data of the embodiment of the present invention (Part 5).

When the memory card is not the memory card 30 for the game of the present embodiment or when the memory card is the memory card 30 for the game of the present embodiment but stores none of the character data, as illustrated in FIG. 12B, "This memory card has no character data" is displayed.

Figure 13A:
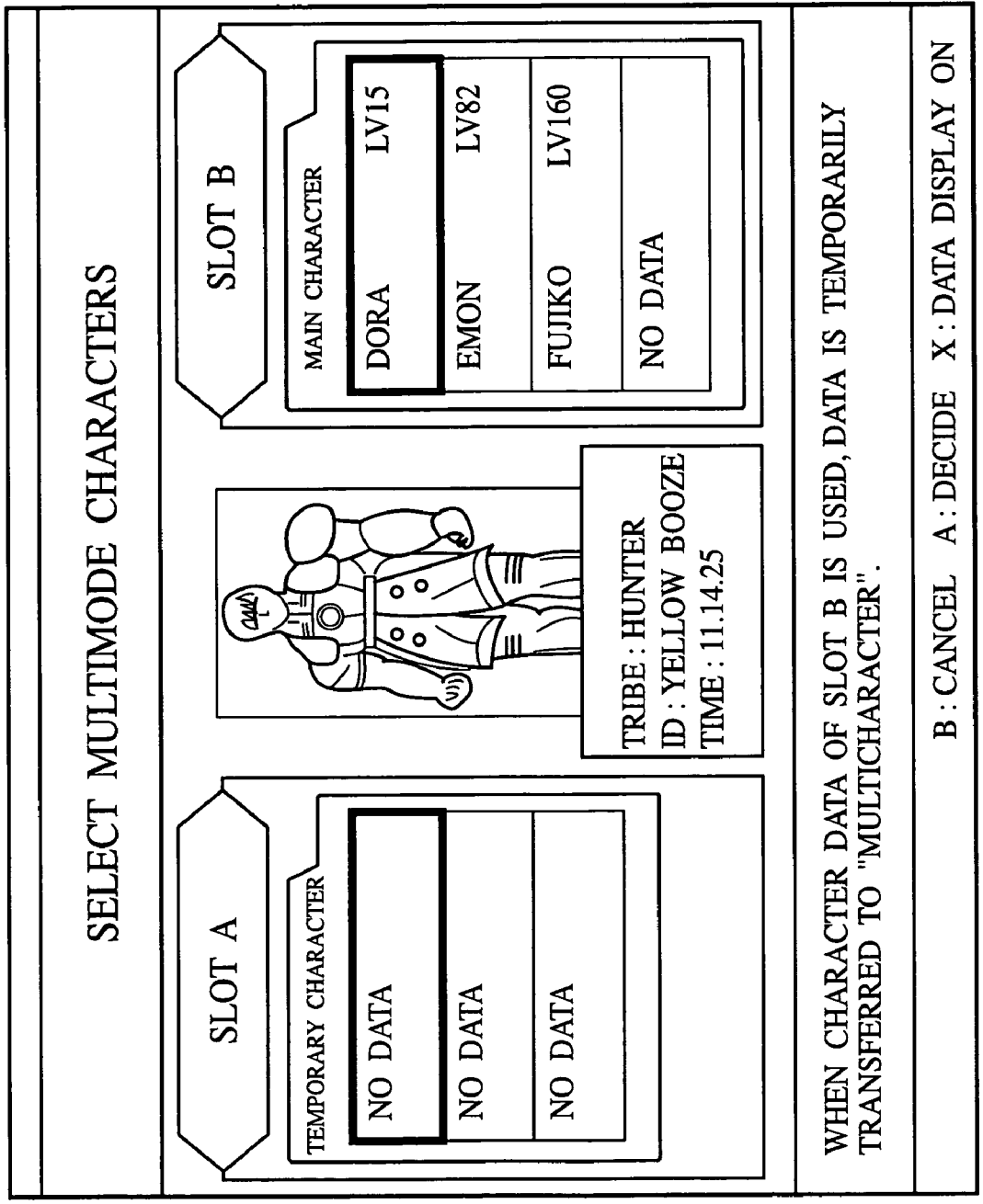
FIG. 13 is views of images for the operation of selecting character data of the embodiment of the present invention (Part 6).

When the memory card stores the character data, as illustrated in FIG. 13A, the indicator of the slot B is brightened to indicate the main character region 33 of the memory card 30 is displayed.

Figure 13B:
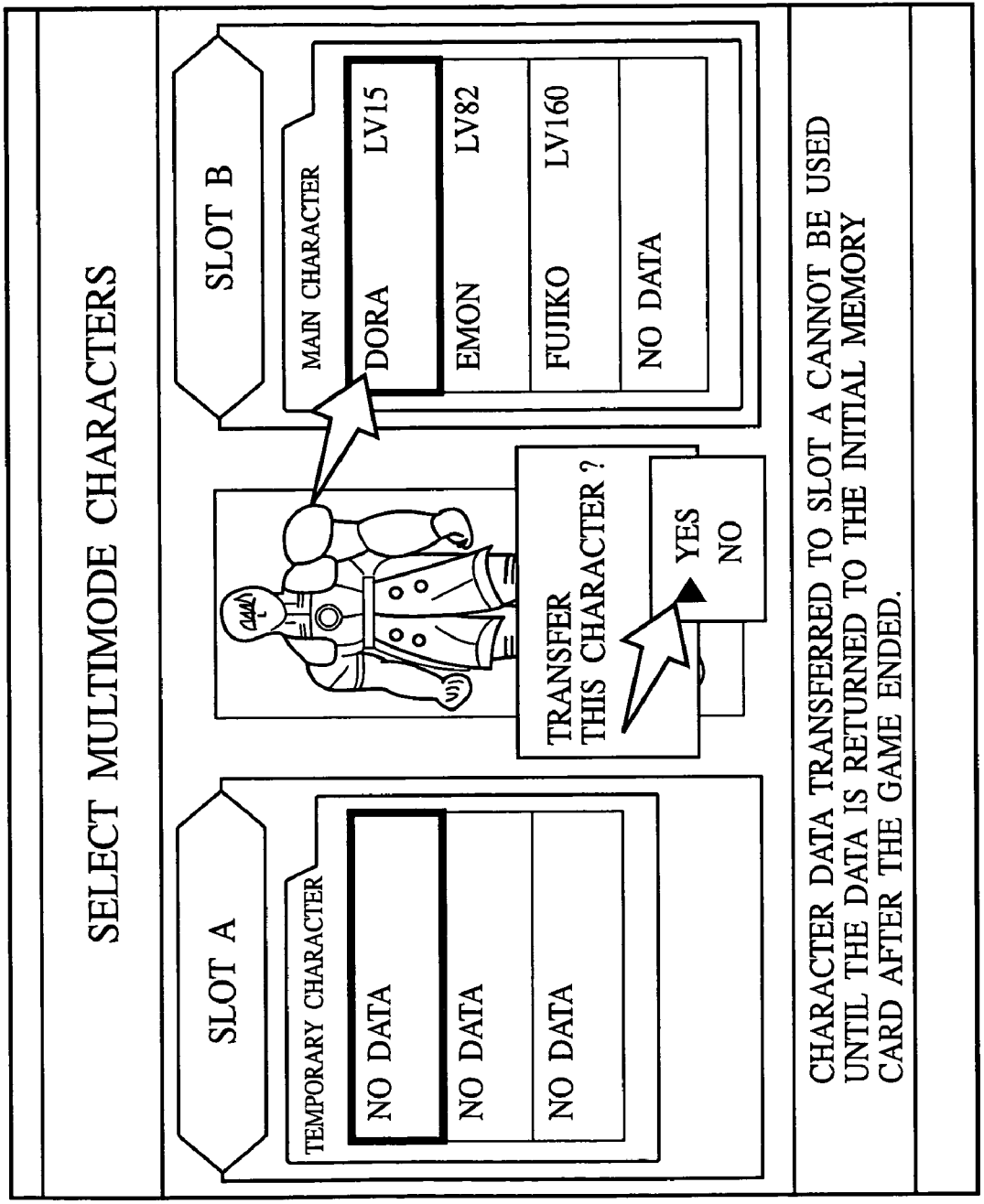

Subsequently, as illustrated in FIG. 13B, the character data of the slot B is selected, and a character data region of the slot A for the selected character data to be stored in is selected. A window "Transfer this character? Yes/No" is displayed at the center of the screen.

Figure 14A:
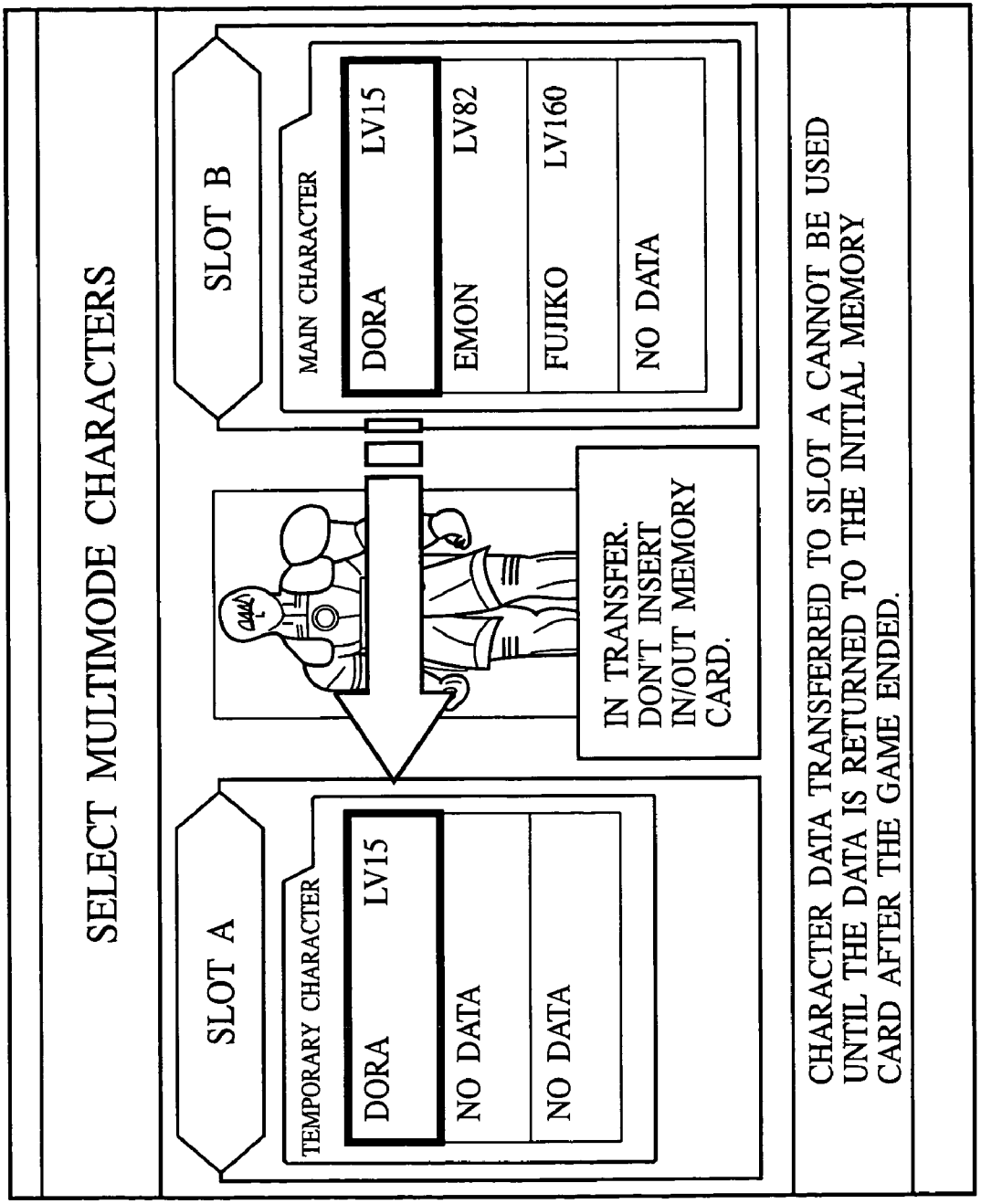
FIG. 14 is views of images for the operation of selecting character data of the embodiment of the present invention (Part 7).

When "Yes" is selected here, the transfer of the character data is started, and the image indicating the data being transferred as shown in FIG. 14A is displayed. On the screen "Being transferred. Don't insert into/out the memory card" is displayed.

When the data is transferred, the time stamp is recorded in the character data of the slot B, and then the character data is transferred. As described above, based on the time stamp recorded when character data was produced, and the time stamp recorded when the character data was transferred, the transferred data is identified. Character data is identified when these two time stamps agree with each other.

Figure 14B:
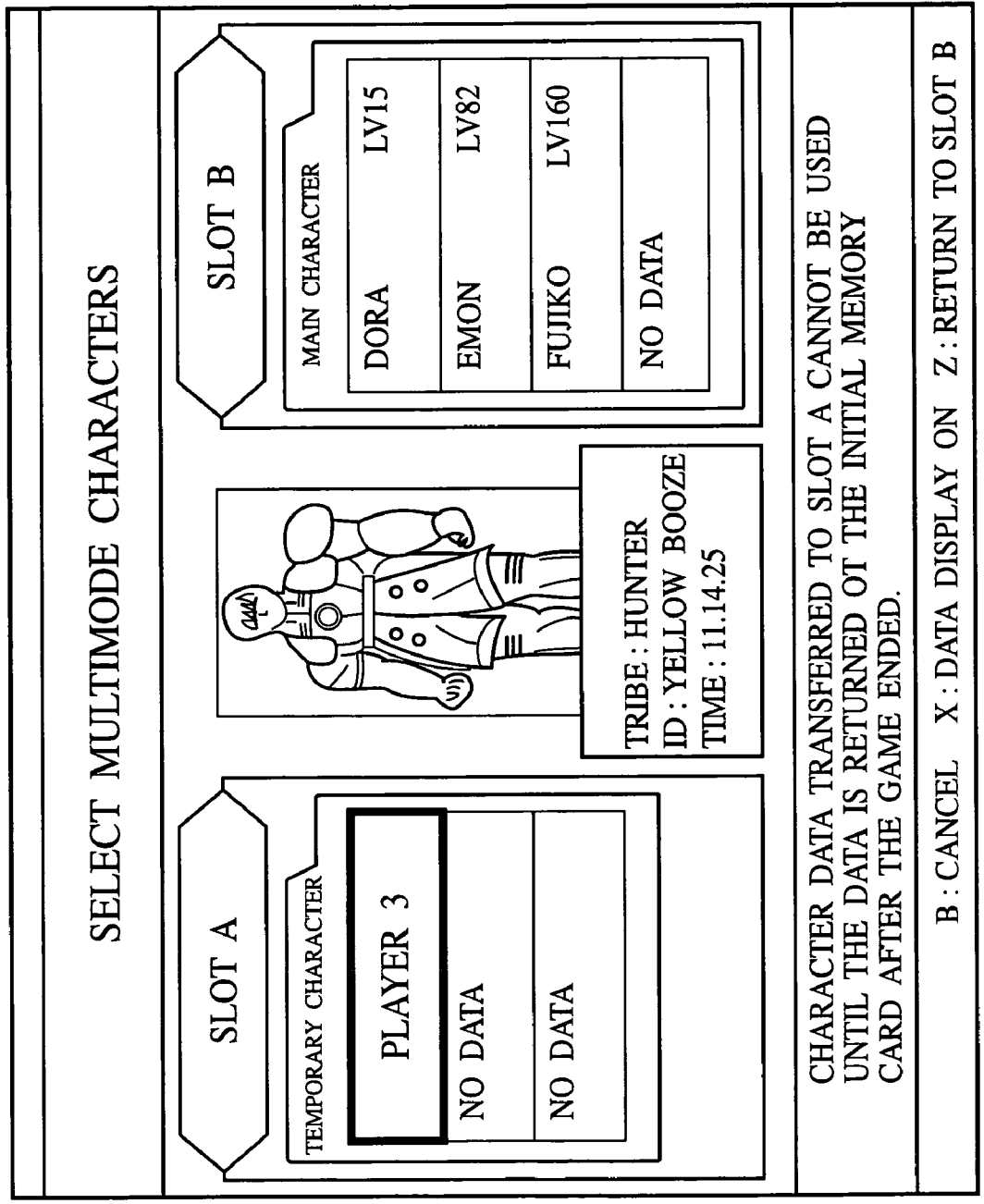

When the transfer of the data is completed, as illustrated in FIG. 14B, the character of Player 3 is decided, and the cursor can not be moved. With cursor made unmovable, a button of the controller 20 is pushed to select one of "A: Decide, X: Data image ON, Z: Return to Slot B". In FIG. 14B, the button A is pushed to decide the character of Player 3.

Subsequently a character of Player 4 is being decided. However, if the controller 20 is not connected to the controller connector 4, the display illustrated in FIG. 15A automatically follows but the image of selecting characters does not follow. If the controller 2 is connected to the controller connector 4, the image of selecting character follows.

(Start the Game)

Figure 15B:
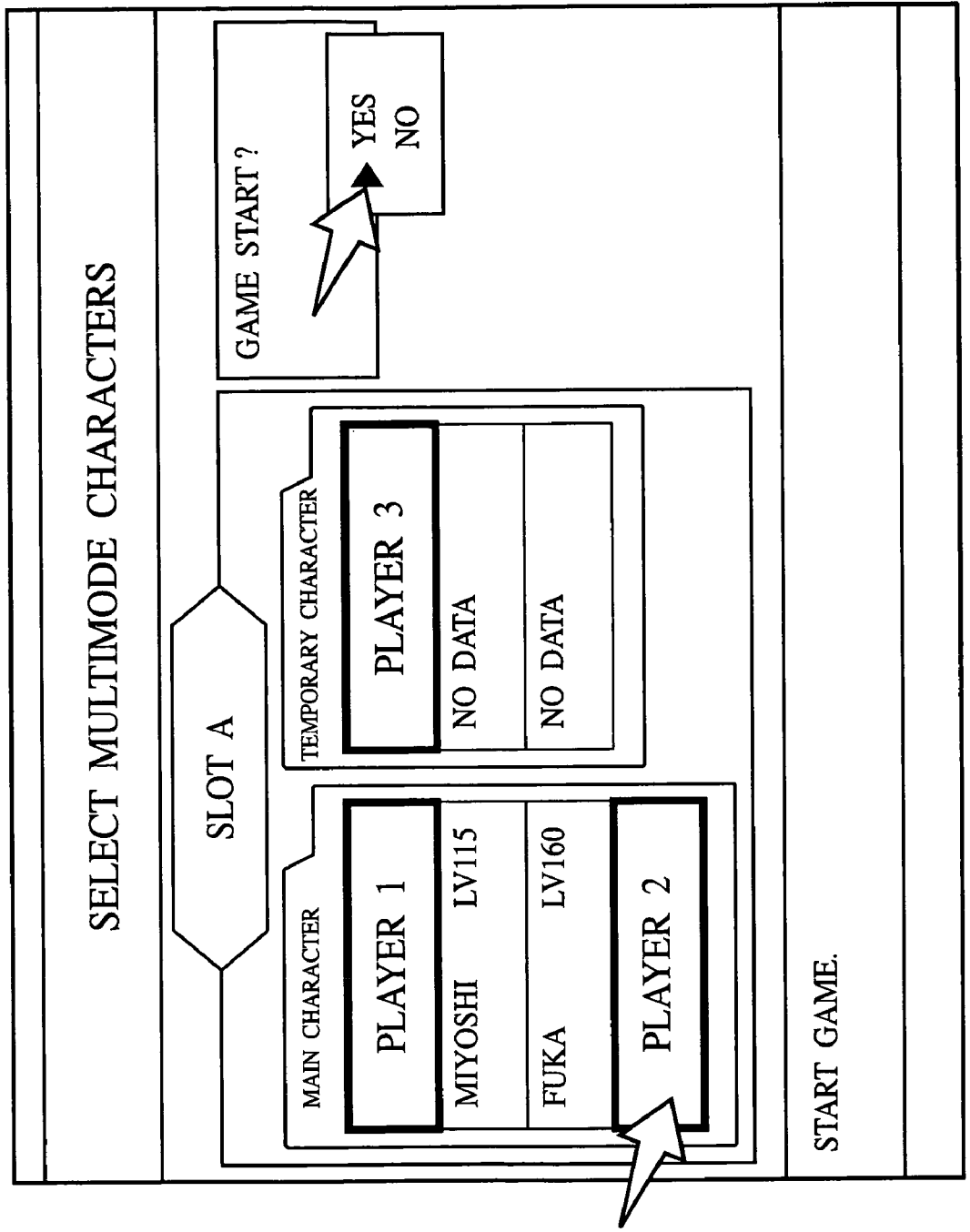
FIG. 15 is views of images for the operation of selecting character data of the embodiment of the present invention (Part 8).

With the characters of three players decided, as illustrated in FIG. 15A, "Start button: Start game" is displayed on the screen. When the start button is pushed, as illustrated in FIG. 15B, "The game starts?" and "Yes/No" are displayed. When "Yes" is selected, the game is started by 3 players. "Yes" is selected here, and the game is started.

Figure 16A:
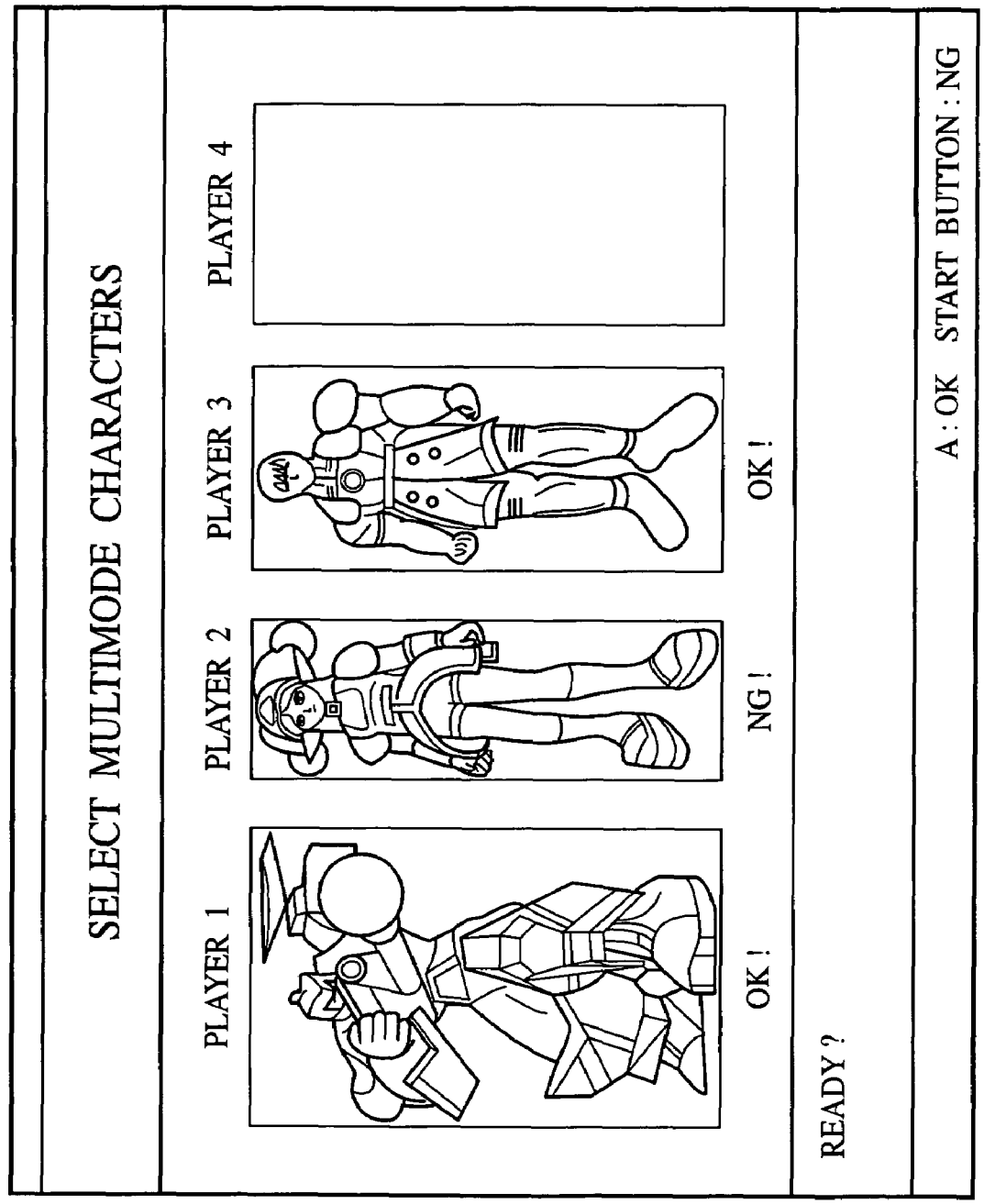
FIG. 16 is views of images for the operation of selecting character data of the embodiment of the present invention (Part 9).

When the game is started, the character confirmation image illustrated in FIG. 16A follows, and the characters of Players 1 to 3 which have been selected by the above-described operation are displayed for confirmation. The three players watch their own player characters, and when no problem, they push the button A (OK) and push the start button (NG) if any problem. In FIG. 16A, Player 1 and Player 3 push the button A, and Player 2 pushes the start button. Player 2, who has pushed the start button (NG), again selects a character. When all the players push button A (OK), the game is started.

When the memory card in the slot A is taken out in the operation, as illustrated in FIG. 16B, a warning "Return the memory card into the slot A" is displayed, and the operation is all paused. This state is retained until the memory card is returned to the slot A.

(Save Data After the Game is Over)

The operation of saving data after the game has ended in the game apparatus according to the present embodiment will be explained. An example of the operation after the game has ended, which is of Steps S37-S42 of the flow chart of FIG. 5, will be explained with reference to the images of FIGS. 17 to 21.

(Save Data)

Figure 17B:
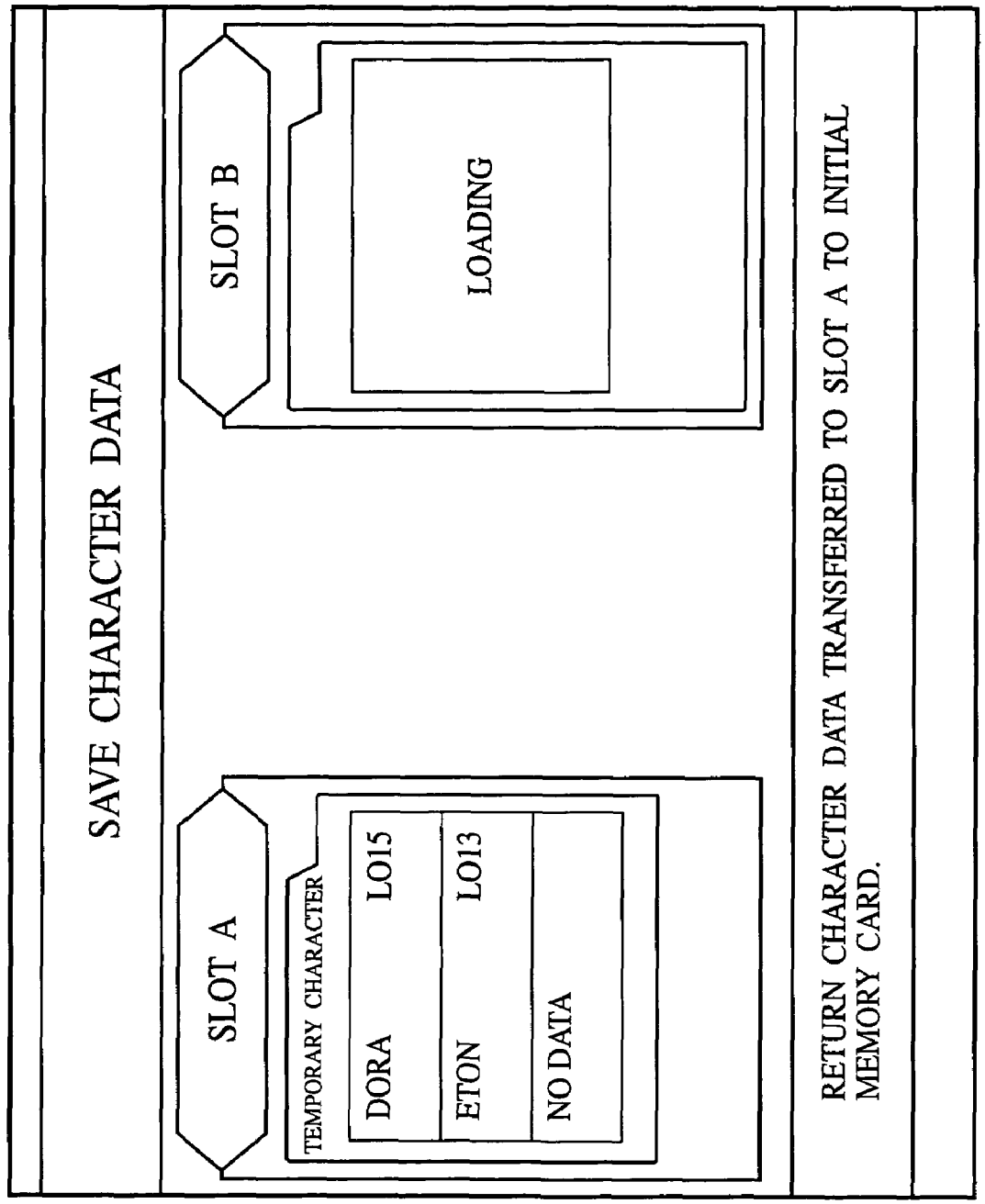
FIG. 17 is views of images for the data saving operation of the embodiment of the present invention after the end of the game (Part 1).

After the game has ended, the character data stored in the temporary character region 34 used in the multimode is returned to the initial memory card. To this end, the data save image of FIG. 17A is displayed. At the center of the screen, "Insert the initial memory card into the slot B" is displayed.

Then, the start button of the controller 20 is pushed, and the data save operation can be skipped.

When no character data is stored anywhere in the temporary character region 34, the data save image is not displayed. When all the character data is stored in the main character region 33, after the data save, the first title image follows.

When the memory card is inserted into the slot B, as illustrated in FIG. 7B, an indication that the slot B is loading data is displayed.

When the data loading is completed, the image illustrated in FIG. 18A is displayed. When the initial character data is in the slot B, a window "This character is returned to the initial memory card. All right? Yes/No" is displayed.

Figure 18B:
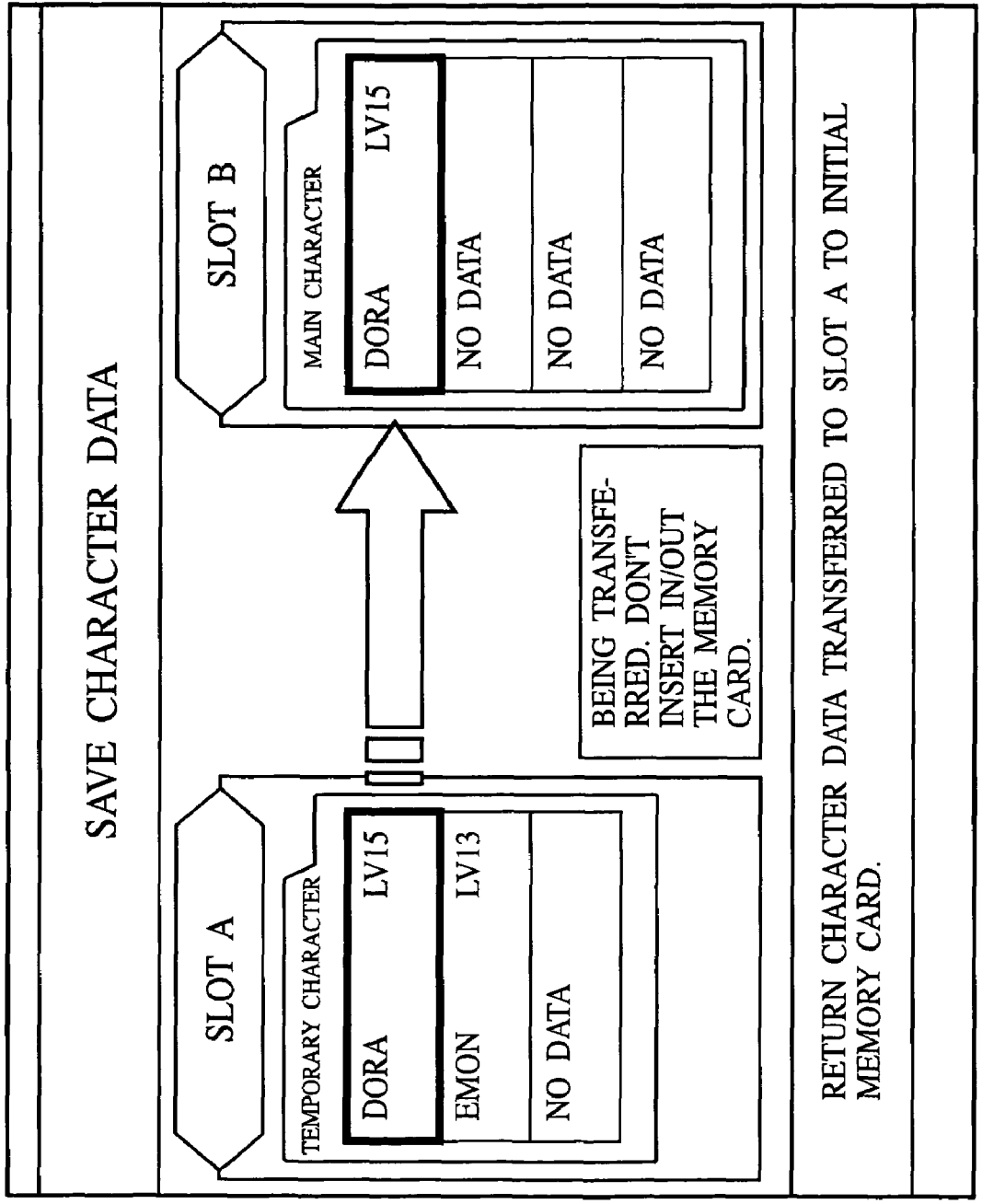
FIG. 18 is views of images for the data saving operation of the embodiment of the present invention after the end of the game (Part 2).

When "No" is selected, the button A is pushed to open the window of the above image. Then the start button is pushed to skip the operational image. When "Yes" is selected, the image of FIG. 18B is displayed on the screen to indicate the data is being transferred.

When the data transfer has completed, as illustrated in FIG. 19A, the name of the character transferred from the temporary character region 34 in the slot A vanishes, and the next character name is moved up. In the same way, the data is saved in the initial memory card. In this way, the data is sequentially retuned to the initial memory card. This operation is performed until no data to be returned to the slot A is present. When all the data have been saved, the title image follows.

(When No Character Data is Stored in the Memory Card)

When no character data is stored in the memory card in the slot B, as illustrated in FIG. 19B, "Insert the initial memory card into the slot B" is displayed at the center of the screen, and at the position of slot B, "This memory card stores no character data" is displayed.

(When the Initial Character Data is Not Stored in the Memory Card)

When character data is stored in the memory card in the slot B but is found not to be the initial character data, based on the comparison between the time stamps, as illustrated in FIG.

20A, "The initial character data is not stored in the slot B. Insert the memory card storing the initial character data" is displayed at the center of the screen. The same display is made when both data cannot be found to be the data of the one and the same character because of unfairness.

(When the Start Button is Pushed to Skip This Operation)

When the start button is pushed to skip the data save operation, as illustrated in FIG. 20B, a warning message "The game is ended without returning the character data to the initial memory card. Unless the character data is returned, the character data cannot be used. All right? Yes/No" is displayed at the center of the screen.

(When the Memory Card in the Slot A is Taken Out in the Data Save Operation)

Figure 21:
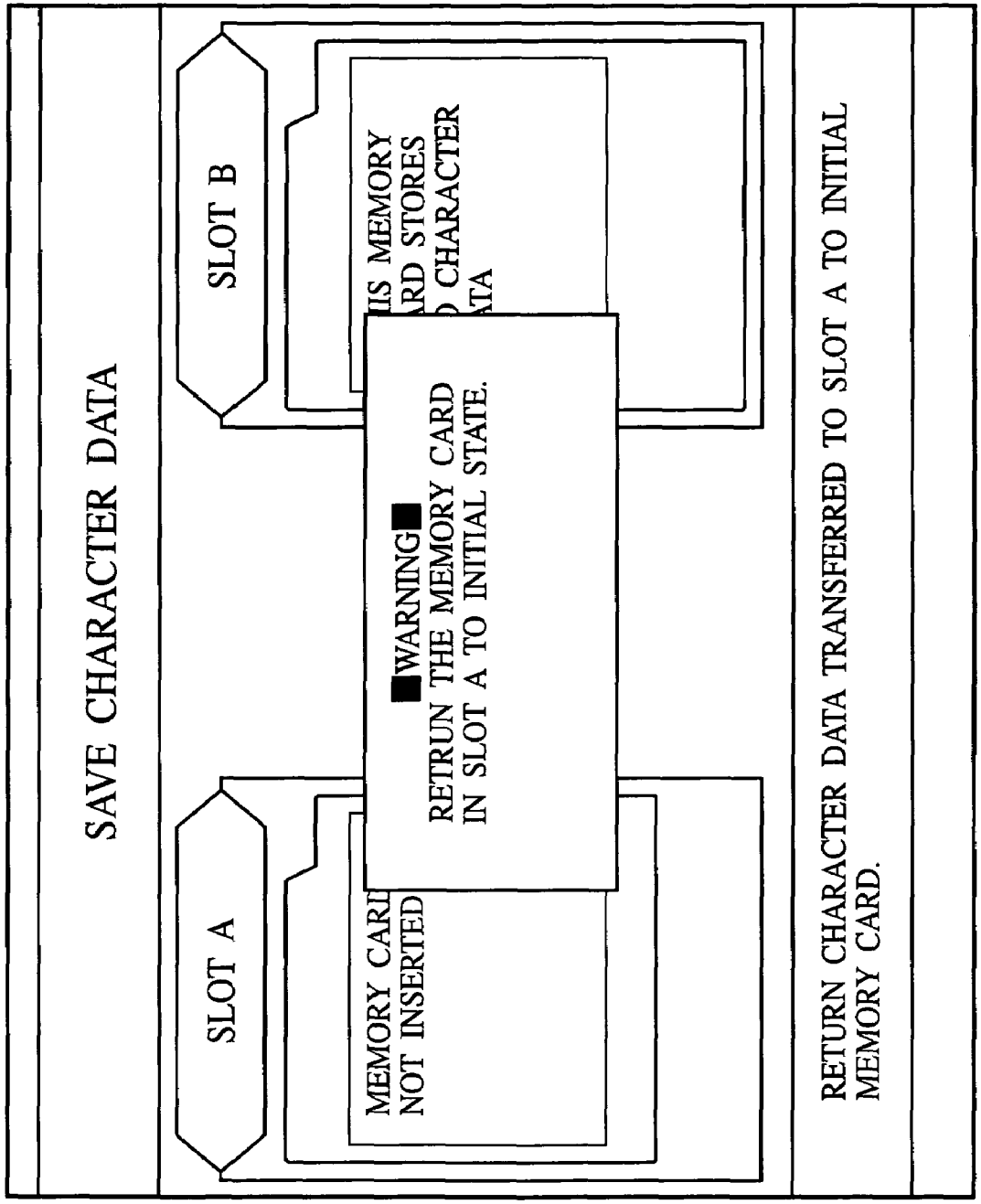
FIG. 21 is views of images for the data saving operation of the embodiment of the present invention after the end of the game (Part 5).

When the memory card in the slot A is taken out in the data save operation, as illustrated in FIG. 21, a warning message "Return the memory card in the slot A to the initial state" is displayed at the center of the screen, and the operation is interrupted.

(Take In/Out Items)

In the game apparatus according to the present embodiment, the take in/out of items in the multimode is partially restricted so as to prevent unfair copy and multiplication of items. Major items whose data can be taken in are as follows.

For the character data, all statuses, such as character levels, etc., can be taken in. The statuses added in the multimode can be taken out.

For the item data, only equipments of the characters can be taken in. However, the equipments can be "put off" and "put on" but cannot be left. This is for the prevention of the multiplication of the items by the item exchanges in the multimode. Items even grown and connoisseured in the multimode can be taken out.

The items obtained in the multimode game can be left or be exchanged with those of other players. The times obtained in the multimode can be taken out, but they are checked at the checker.

The money (meseta) cannot be taken in the game in the multimode. The money (meseta) obtained in the multimode can be taken out but only checked in the checker.

As for the challenge/battle data, the results in the online mode cannot be taken into the multimode and cannot be taken out. The result in the online mode and the result in the multimode are saved and managed as separate data.

When the game ends, the items to be taken out are checked in the check room. The items which have been initially in the check room cannot be taken out but can be thrown away. The check room can be thus made any room.

When any items are not checked in the check room, a warning message "Items except the items which have been initially taken in are all deleted unless they are checked in the check room. Is it all right? Yes/No" is displayed.

Modified Embodiments

The present invention is not limited to the above-described embodiment and can cover other various modifications.

For example, in the above-described embodiment, the present invention is applied to the case that the number of the memory slots of the game apparatus is insufficient for the number of players. However, the present application is applicable to the case that a number of the memory slots agrees with a number of players, and the game data may be stored in one memory card.

In the above-described embodiment, the prescribed memory regions are provided in a memory card inserted in a specific slot, i.e., the slot A but may be provided in other regions, e.g., the memory regions of the game apparatus or the regions in the memory server. The memory region of each player is provided in the memory card of the player but may be provided in other regions, e.g., the region in the memory server for the player, or other regions.

The techniques described in the embodiment described above may be combined with each other, or a part of one embodiment may be used in other embodiments.

INDUSTRIAL APPLICABILITY

The present invention is suitable for game control methods, more specifically a game control method suitable for games in online mode which a plurality of players take part in.

The invention claimed is:

1. A storage medium stored computer-readably with a program with associated game data of game characters and game items, said program being executable on a game device having a computer on which plural players are allowed to play a game together, wherein said game device is provided with plural slots each configured to removably insert a memory medium, said program being configured to cause said game device to perform:
(a) reading data of a game character and a game item attributed to the game character, if any, from each of the memory mediums inserted in said slots, said data of the game characters and the game items having been recorded when the players finished the game at intermediate stages in last plays, respectively;
(b) allowing the players to resume the game from an intermediate stage, wherein the players are allowed to use their own game items in the game space, if any, which are read from the memory medium belonging to the players, respectively;
(c) allowing the players to play the game together wherein each player plays the game by controlling the player character which is specified by the data read from the memory mediums associated with each player respectively;
(d) allowing each of the players to cause the player character under the control of the player to obtain items which appear in the game space during the progress of the game so that the items obtained are attributed to that player's character;
(e) allowing the players to trade items obtained in the game space during the progress of the game;
(f) prohibiting the players from trading items read from the memory mediums in the game space during the progress of the game;
(g) allowing each of the players to store, in the player's original memory medium inserted in the slot, renewed data indicative of the player character and the game items, if any, which have been obtained during the progress of the game and attributed to the player character at the time of finishing the game at a stage of the game, wherein the renewed data replaces the data originally existing at step (a) in the respective memory mediums and the respective original data is deleted from the memory mediums; and
(h) prohibiting the renewed data for one of the players to include an item which was included in the memory mediums belonging to another of the players at the step (a).

2. A game program configured to be read and executed by a computer game device to which plural controllers are connected so that plural players are allowed to play together a game which develops on the game device by execution of the game program, wherein the game program is configured, with associated game data of game characters and game items, to cause the game device to perform the game wherein respective players control, by manipulating the controllers, corresponding game characters selected by the players, respectively, said program being configured to cause said game device to perform:

(a) reading data of a game character and a game item attributed to the game character, if any, from each of the memory mediums inserted in said slots, said data of the game characters and the game items having been recorded when the players finished the game at intermediate stages in last plays, respectively;

(b) allowing the players to resume the game from an intermediate stage, wherein the players are allowed to use their own game item in the game space, if any, which are read from the memory medium belonging to the player, respectively;

(c) allowing the players to play the game together, wherein each player plays the game by controlling the player character which is specified by the data read from the memory mediums associated with each player respectively;

(d) allowing each of the players to cause the player character under the control of the player to obtain items which appear in the game space during the progress of the game so that the items obtained are attributed to that player's character;

(e) allowing the players to trade items obtained in the game space during the progress of the game;

(f) prohibiting the players from trading items read from the memory mediums in the game space during the progress of the game;

(g) allowing each of the players to store, in the player's original memory medium inserted in the slot, renewed data indicative of the player character and the game items, if any, which have been obtained during the progress of the game and attributed to the player character at the time of finishing the game at a stage of the game, wherein the renewed data replaces the data originally existing at step (a) in the respective memory mediums and the respective original data is deleted from the memory mediums; and (h) prohibiting the renewed data for one of the players to include an item which was included in the memory mediums belonging to another of the players at the step (a).

* * * * *

UNITED STATES PATENT AND TRADEMARK OFFICE
CERTIFICATE OF CORRECTION

PATENT NO. : 7,582,018 B2 Page 1 of 1
APPLICATION NO. : 10/515065
DATED : September 1, 2009
INVENTOR(S) : Shintaro Hata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 346 days.

Signed and Sealed this

Fourteenth Day of September, 2010

David J. Kappos
*Director of the United States Patent and Trademark Office*